(12) United States Patent
Pearman et al.

(10) Patent No.: US 11,707,794 B2
(45) Date of Patent: *Jul. 25, 2023

(54) WELDING LEAD CONNECTOR AND WELDING LEAD CONNECTOR INCLUDING LOCKING MECHANISM

(71) Applicant: Alpha/Omega Energy Solutions, LLC, Cumberland Gap, TN (US)

(72) Inventors: Bradley Lance Pearman, Cumberland Gap, TN (US); Kenny Lavelle Miller, Madeira Beach, FL (US)

(73) Assignee: Alpha/Omega Energy Solutions, LLC, Cumberland Gap, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/327,900

(22) Filed: May 24, 2021

(65) Prior Publication Data

US 2021/0354226 A1 Nov. 18, 2021

Related U.S. Application Data

(63) Continuation of application No. 17/004,181, filed on Aug. 27, 2020, now Pat. No. 11,020,812, which is a
(Continued)

(51) Int. Cl.
*B23K 9/10* (2006.01)
*H01R 4/70* (2006.01)
(Continued)

(52) U.S. Cl.
CPC .............. *B23K 9/10* (2013.01); *B23K 9/321* (2013.01); *H01R 4/70* (2013.01); *H01R 13/518* (2013.01);
(Continued)

(58) Field of Classification Search
CPC ............... H01R 13/6397; H01R 13/213; H01R 13/518; H01R 13/701; H01R 13/5213;
(Continued)

(56) References Cited

U.S. PATENT DOCUMENTS 2,518,289 A 4/1950 Cox
2,873,357 A 2/1959 Landis
(Continued)

FOREIGN PATENT DOCUMENTS

CA 552341 1/1958
CA 2485302 6/2005
(Continued)

OTHER PUBLICATIONS

Non-Final Office Action, U.S. Appl. No. 16/180,540 (dated Oct. 2, 2019).
(Continued)

*Primary Examiner* — Gary F Paumen
(74) *Attorney, Agent, or Firm* — Robinson IP Law, PLLC

(57) ABSTRACT

A male welding lead connector apparatus including a slidable member to block the male welding lead connector from rotating relative to a female welding lead connector when the two connectors are engaged with one another. A method of locking a male welding lead connector to a female welding lead connector using a special male welding lead connector including a slidable member to block the male welding lead connector from rotating relative to a female welding lead connector when the two connectors are engaged with one another.

1 Claim, 28 Drawing Sheets

Related U.S. Application Data continuation of application No. 16/872,762, filed on May 12, 2020, now Pat. No. 10,870,163.

(51) Int. Cl.

| | | |
|---|---|---|
| *H01R 13/518* | (2006.01) | |
| *H01R 13/639* | (2006.01) | |
| *H01R 33/97* | (2006.01) | |
| *B23K 9/32* | (2006.01) | |
| *H01R 13/70* | (2006.01) | |
| *H01R 13/52* | (2006.01) | |

(52) U.S. Cl.
CPC ..... *H01R 13/5213* (2013.01); *H01R 13/6397* (2013.01); *H01R 13/701* (2013.01); *H01R 33/97* (2013.01)

(58) Field of Classification Search
CPC ...... H01R 2103/00; H01R 4/70; H01R 33/97; B23K 9/10; B23K 9/321
USPC .................. 439/304, 333, 892, 133, 134
See application file for complete search history.

(56) References Cited

U.S. PATENT DOCUMENTS

| | | | |
|---|---|---|---|
| 2,980,790 | A | 4/1961 | Bracken |
| 3,226,667 | A | 12/1965 | Senior |
| 4,702,539 | A | 10/1987 | Cusick |
| 5,052,939 | A | 10/1991 | Koch |
| 5,061,194 | A | 10/1991 | Herman et al. |
| 5,129,839 | A | 7/1992 | Vanskiver |
| 5,139,429 | A | 8/1992 | Herman et al. |
| 5,217,387 | A | 6/1993 | Hull et al. |
| 5,525,073 | A | 6/1996 | Sampson |
| 5,685,730 | A | 11/1997 | Cameron |
| 5,821,462 | A | 10/1998 | Raleigh |
| 5,844,171 | A | 12/1998 | Fitzgerald |
| 6,184,492 | B1 | 2/2001 | Busopulos |
| 6,848,926 | B2 | 2/2005 | Ling |
| 6,935,871 | B2 | 8/2005 | Maurer |
| 7,077,681 | B2 | 7/2006 | Behoo |
| 7,285,725 | B1 | 10/2007 | Saman |
| 7,384,297 | B2 | 6/2008 | King, Jr. et al. |
| 7,431,611 | B2 | 10/2008 | King, Jr. et al. |
| 8,408,929 | B2 | 4/2013 | Solon |
| 9,211,602 | B1 | 12/2015 | Carney et al. |
| 10,056,745 | B2 | 8/2018 | Nooner et al. |
| 10,431,930 | B1 | 10/2019 | Pearman |
| 10,720,731 | B2 * | 7/2020 | Pearman ............ H01R 13/6275 |
| 10,870,163 | B1 * | 12/2020 | Pearman ................ B23K 9/323 |
| 11,020,812 | B1 * | 6/2021 | Pearman .................. H01R 4/70 |
| 2002/0092837 | A1 | 7/2002 | Keats |
| 2004/0097120 | A1 | 5/2004 | Limber et al. |
| 2004/0144758 | A1 | 7/2004 | Onishi |
| 2005/0136716 | A1 | 6/2005 | Behoo |
| 2007/0037430 | A1 | 2/2007 | Evans |
| 2012/0064744 | A1 | 3/2012 | Messner |
| 2013/0119041 | A1 | 5/2013 | Humenik |
| 2013/0212842 | A1 | 8/2013 | Rigollet et al. |
| 2014/0038439 | A1 | 2/2014 | Lee |
| 2015/0069114 | A1 | 3/2015 | Sunger et al. |
| 2015/0325940 | A1 | 11/2015 | Foseide |
| 2016/0024818 | A1 | 1/2016 | Allen |
| 2017/0087658 | A1 | 3/2017 | Townsend |
| 2017/0110831 | A1 | 4/2017 | Su |
| 2018/0166871 | A1 | 6/2018 | Nooner et al. |
| 2020/0198485 | A1 | 6/2020 | Schwan |

FOREIGN PATENT DOCUMENTS

| | | |
|---|---|---|
| EP | 0918590 | 12/2002 |
| GB | 907905 | 10/1962 |
| GB | 931500 | 7/1963 |
| GB | 1327584 | 8/1973 |
| WO | 9749519 | 12/1997 |
| WO | 2015047552 | 4/2015 |
| WO | 2020096882 | 5/2020 |
| WO | 2020096884 | 5/2020 |

OTHER PUBLICATIONS

International Search Report and Written Opinion of the International Searching Authority, Int. App. No PCT/US19/59341, dated Jan. 21, 2020.

International Search Report and Written Opinion of the International Searching Authority, Int. App. No PCT/US19/59339, dated Jan. 21, 2020.

Written Opinion of the International Searching Authority, Int. App. No. PCT/US2021/027685, dated May 12, 2021.

International Search Report, Int. App. No. PCT/US2021/027685, dated May 12, 2021.

Non-Final Office Action, U.S. Appl. No. 16/872,762 (dated Aug. 7, 2020).

Non-Final Office Action, U.S. Appl. No. 17/004,181 (dated Jan. 28, 2021).

* cited by examiner

PRIOR ART

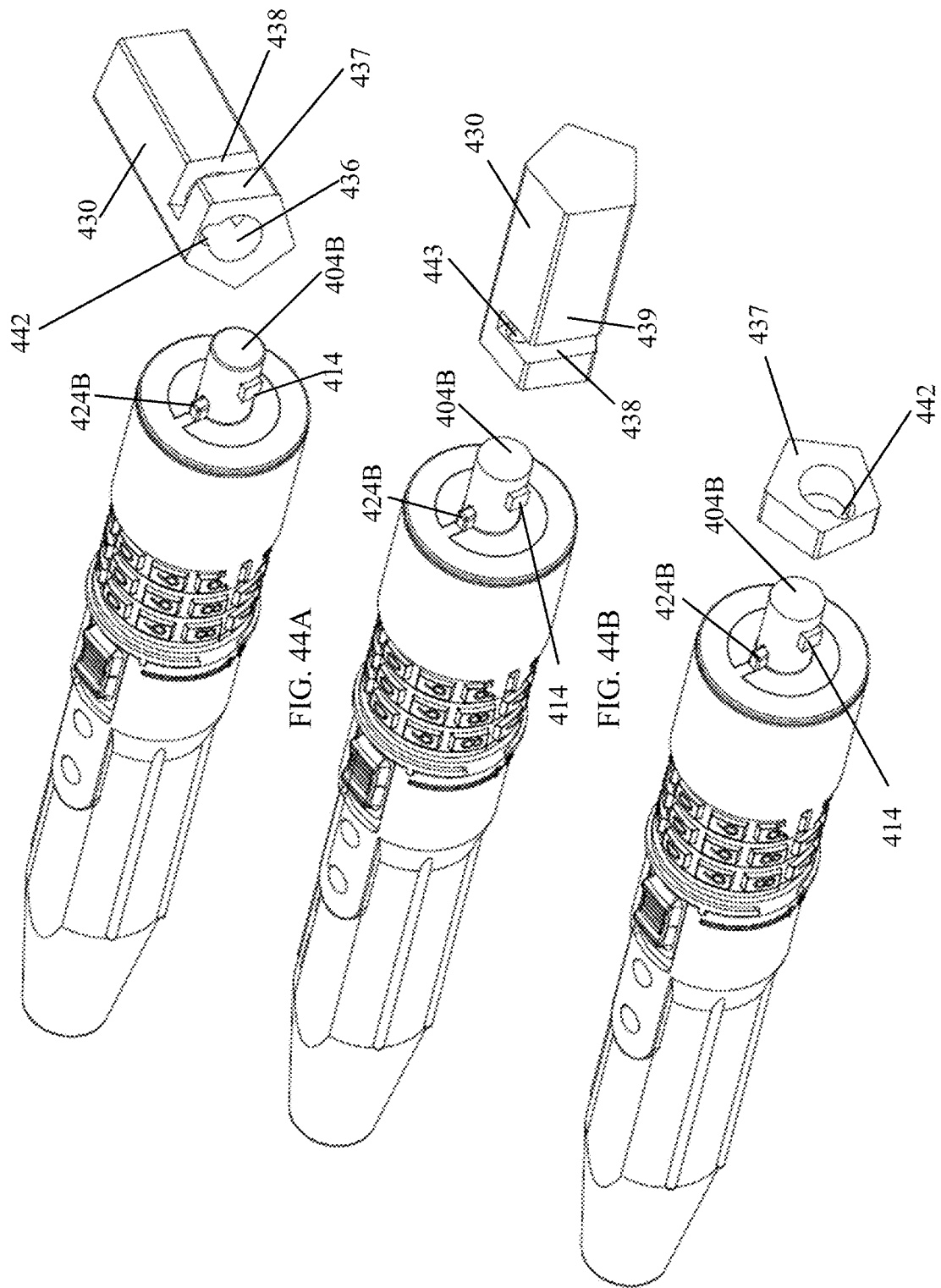

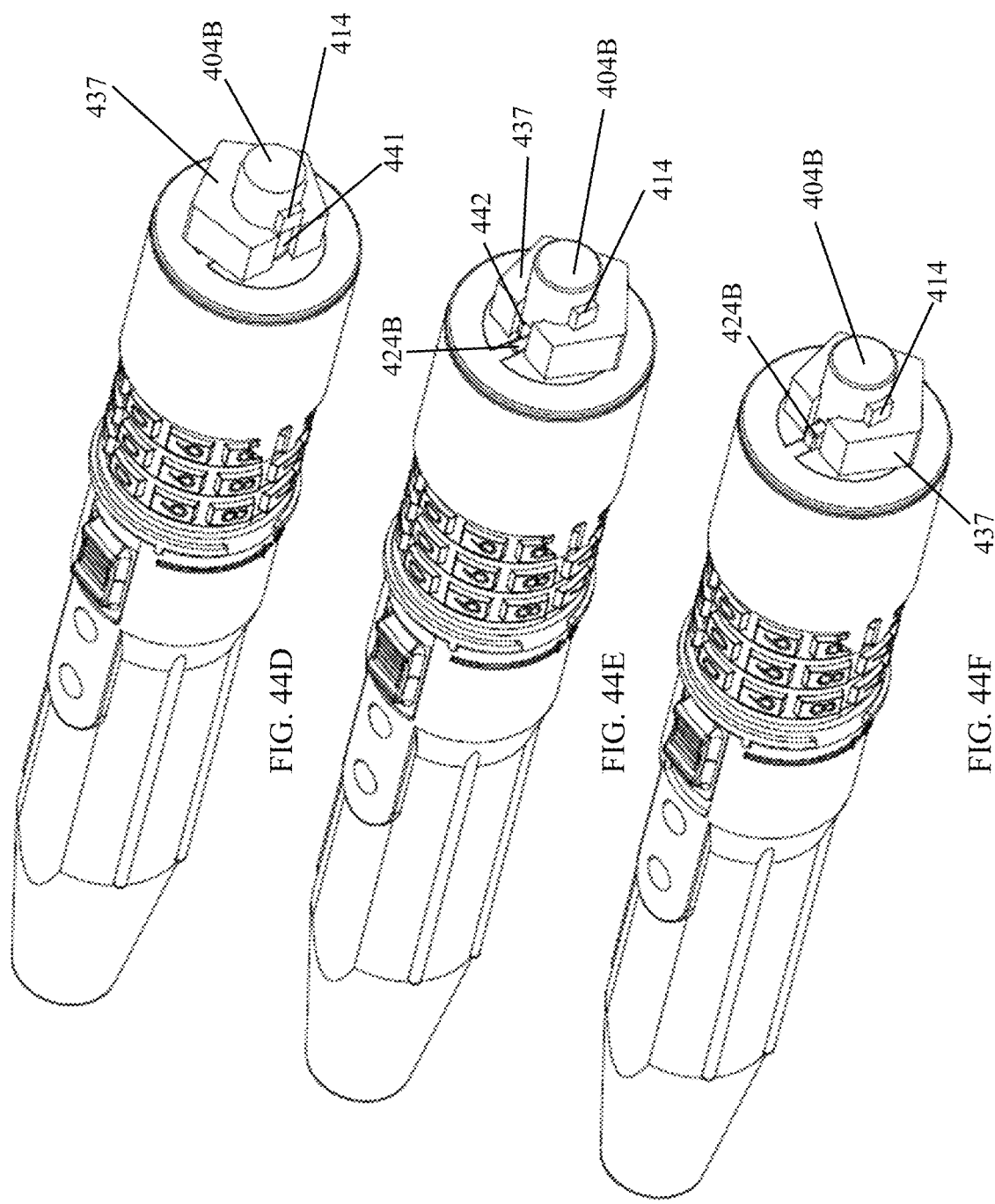

PRIOR ART

WELDING LEAD CONNECTOR AND WELDING LEAD CONNECTOR INCLUDING LOCKING MECHANISM

CROSS-REFERENCE(S) TO RELATED APPLICATION(S)

This application is a continuation of and claims priority to U.S. patent application Ser. No. 17/004,181 entitled "Welding Lead Connector and Welding Lead Connector Including Locking Mechanism" which was filed on Aug. 27, 2020 which is a continuation of and claims priority to U.S. patent application Ser. No. 16/872,762 entitled "Welding Lead Connector and Welding Lead Connector Including Locking Mechanism" which was filed on May 12, 2020 (now U.S. Pat. No. 10,870,163), wherein the entire contents of both prior applications are incorporated herein by reference.

FIELD

This disclosure relates to the field of welding leads and welding lead connectors. More particularly, this disclosure relates to a male welding lead connector with built-in features to secure the male welding lead connector to a female welding lead connector.

BACKGROUND

Welding leads (or "welding cable") is an electrical conductor for transmitting a welding current used for welding materials together (e.g., for arc welding or resistance welding). Welding leads typically include small copper strands wrapped together inside a nonconductive outer layer. Such leads typically have enlarged ends in the form of cable connectors wherein one end is typically a male end and the other a female end with both male and female features being highly conductive.

Welding leads can be both dangerous and expensive. Some dangers include potential electrocution if the connection between a first welding lead cable connector connected to a second welding leads cable connector becomes loose and conductive material is exposed outside or otherwise being the nonconductive outer layer of the welding leads. Although some welding leads have features that help to better secure a connection between other welding leads, connections between welding lead cable connectors can still easily become loose or become disengaged altogether. Some projects including many welding lead lines, sometimes even greater than 100 lines. Often, welders are a significant distance away from where their welding line is connected. If one welding line twists and the welding lead connectors become disconnected, a welder's welding equipment will stop working. Such welder will have to carefully and methodically trace back his or her welding line to distinguish it from other lines in order to find where the disconnection took place, taking a significant amount of time. Meanwhile, the welding lead that became disconnected is exposed and is an electrocution risk to others in the work site. The relative ease at which such leads can be disconnected also makes them susceptible to theft.

Some devices exist to help with these needs including, for example, U.S. Pat. No. 10,431,930 entitled "Welding Lead Cable Connector Holding Apparatus for Locking and Protecting Welding Leads" to Pearman discloses a device which can be used in conjunction with a connected pair of male and female welding lead connectors to hold the connectors securely together. The device is separate from the welding lead connectors themselves.

What is needed, therefore, is a way to secure welding lead connectors to prevent electrical hazards and theft of welding leads without requiring a separate device.

SUMMARY

The above and other needs are met by a male welding lead connector that incudes built-in features that allow it to be secured to a female welding lead connector. There are different versions of the male welding lead connector to accommodate different female welding lead connector designs and models. Generally speaking, the male welding lead connector includes a slidable member to can be slid out to block a female welding lead connector from rotating relative to the male welding lead connector after the two have been engaged. This prevents the two devices from easily disengaging due to twisting motions that can occur from time to time which disengage welding leads, exposing an electrical hazard.

In a preferred embodiment, the male welding lead connector comprises a core member comprising a first end and a second end wherein the second end is configured for being inserted in and rotated in a female welding lead connector. The core member further includes an annular space defined in part by an annular channel proximate to the second end of the core member; a slot extending at least partially along the core member to the second end of the core member; and an annular ring along the second end of the core member, the ring including a flat edge including a notch defining a second end of the slot. The male welding lead connector further includes a slidable member comprising a first end and a second end, the slidable member engaged in the slot and configured to slide from a first position wherein the annular space is clear to a second position wherein the second end of the slidable member blocks a first portion of the annular space.

In a preferred embodiment, the male welding lead connector further comprises a slide button wherein the first end of the slidable member is connected to the slide button for moving the slidable member to or from the first position or the second position, the slidable member further comprising a plurality of teeth aligned in series together along the slidable member. The male welding lead connector further includes a multiple-dial combination lock comprising a plurality of rotatable discs configured to rotate around the core member and including alpha-numeric characters along outer surfaces of the discs, wherein the plurality of discs are configured to selectively align with the plurality of teeth of the slidable member based on the rotational positions of the plurality of rotatable discs wherein the slidable member is free to move from the second position to the first position when the plurality of discs are selectively aligned with the plurality of teeth and wherein the plurality of discs prevent the slidable member from moving from the second position to the first position when at least one disc of the plurality of discs is misaligned with the plurality of teeth of the slidable member. In a preferred embodiment, the plurality of rotatable discs further include a first rotatable disc further comprising a first slot; a second rotatable disc further comprising a second slot; and a third rotatable disc further comprising a third slot wherein the plurality of rotatable discs are in an unlocked position when the first slot, the second slot, and the third slot are aligned with the plurality of teeth of the slidable member enabling the slidable member to move to or from the first position or the second position and wherein the plurality of rotatable discs are in a locked position when at least the first slot, the second slot, or the third slot are misaligned with the plurality of teeth of the slidable member, thereby prohibiting movement of the slidable member from the second position to the first position.

In some embodiments, the male welding lead connector further comprises the core member further comprising an elongate cavity including an end wall; the slidable member further comprising a projection proximate the first end of the slidable member configured to slide within the elongate cavity; and a spring engaged between a first end of the projection and the end wall, wherein the spring biases the slidable member toward the second position.

Preferably, the male welding lead connector includes a shell covering a portion of the core member along the first end of the core member.

In a preferred embodiment, the male welding lead connector includes a hollow cylindrical sheath slidably attached along an outer surface of the male welding lead connector wherein the sheath is configured to slide from an unsheathed position proximate to the second end of the core member to a sheathed position wherein the sheath covers the plurality of rotatable discs.

In another aspect, a method of securing a male welding lead connector to a female welding lead connector is disclosed, the method comprising providing a male welding lead connector comprising a slide button; a core member including a first end and a second end; and a slidable member engaged in the slot and configured to slide from a first position wherein the annular space is clear to a second position wherein a second end of the slidable member blocks a first portion of the annular space, wherein the first end of the slidable member is connected to the slide button for moving the slidable member to or from the first position or the second position. The core member further includes an annular space defined in part by an annular channel proximate to the second end of the core member; a slot extending at least partially along the core member to the second end of the core member; and an annular ring along the second end of the core member, the ring including a flat edge including a notch defining a second end of the slot. The method further includes providing a female welding lead connector comprising a cavity defined by an interior surface of the female welding lead connector, the cavity configured for receiving the second end of the core member; and a protrusion along the interior surface of the cavity. The method further includes inserting the second end of the core member of the male welding lead connector into the cavity of the female welding lead connector a distance sufficient for the protrusion to clear the flat edge of the annular member of the core member such that the protrusion is aligned with a portion of the annular space; rotating the female welding lead connector relative to the male welding lead connector such that the protrusion of the female welding lead connector enters the annular channel; moving the slide button such that the slidable member moves from the first position to the second position, thereby blocking the annular channel with the second end of the slidable member and preventing the female welding lead connector from rotating relative to the male welding lead connector, thereby locking the female welding lead connector to the male welding lead connector.

In some embodiments of the method, the provided male welding lead connector further comprises the slidable member further comprising a first end and a plurality of teeth aligned in series together proximate to the first end of the slidable member; and a multiple-dial combination lock comprising a plurality of rotatable discs configured to rotate around the core member and including alpha-numeric characters along outer surfaces of the discs, wherein the plurality of discs are configured to selectively align with the plurality of teeth of the slidable member based on the rotational positions of the plurality of rotatable discs wherein the slidable member is free to move from the second position to the first position when the plurality of discs are selectively aligned with the plurality of teeth and wherein the plurality of discs prevent the slidable member from moving from the second position to the first position when at least one disc of the plurality of discs is misaligned with the plurality of teeth of the slidable member.

In some embodiments, the step of moving the slide button further comprises rotating at least one of the rotatable discs to misalign the at least one of the rotatable discs with the plurality of teeth of the slidable member, thereby preventing the slidable member from moving back to the first position to unlock the female welding lead connector from the male welding lead connector.

In another aspect, embodiments of the disclosure provide a male welding lead connector comprising a core member comprising a first end and a second end wherein the second end is configured for being inserted in and rotated in an female welding lead connector, the core member further comprising a slot extending lengthwise at least partially along the core member; and a protuberance extending radially outward proximate to the second end of the core member. The male welding lead connector further comprises a slidable member comprising a first end and a second end, the slidable member engaged in the slot and configured to slide from a first position wherein the second end of the slidable member is farther from the second end of the core member to a second position wherein the second end of the slidable member is closer to the second end of the core member. Preferably, the protuberance is in a radial position located approximately 45 degrees from a radial position of the second end of the slidable member.

In some embodiments, the male welding lead connector further comprises a slide button; the slidable member wherein the first end of the slidable member is connected to the slide button for moving the slidable member to or from the first position or the second position, the slidable member further comprising a plurality of teeth aligned in series together along the slidable member; and a multiple-dial combination lock comprising a plurality of rotatable discs configured to rotate around the core member and including alpha-numeric characters along outer surfaces of the discs, wherein the plurality of discs are configured to selectively align with the plurality of teeth of the slidable member based on the rotational positions of the plurality of rotatable discs wherein the slidable member is free to move from the second position to the first position when the plurality of discs are selectively aligned with the plurality of teeth and wherein the plurality of discs prevent the slidable member from moving from the second position to the first position when at least one disc of the plurality of discs is misaligned with the plurality of teeth of the slidable member.

In some embodiments the plurality of rotatable discs further comprise a first rotatable disc further comprising a first slot; a second rotatable disc further comprising a second slot; and a third rotatable disc further comprising a third slot wherein the plurality of rotatable discs are in an unlocked position when the first slot, the second slot, and the third slot are aligned with the plurality of teeth of the slidable member enabling the slidable member to move to or from the first position or the second position and wherein the plurality of rotatable discs are in a locked position when at least the first slot, the second slot, or the third slot are misaligned with the plurality of teeth of the slidable member, thereby prohibiting movement of the slidable member from the second position to the first position.

In some embodiments, the male welding lead connector further comprises the core member further comprising an elongate cavity including an end wall; the slidable member further comprising a projection proximate the first end of the slidable member configured to slide within the elongate cavity; and a spring engaged between a first end of the projection and the end wall, wherein the spring biases the slidable member toward the second position.

Preferably, the male welding lead connector includes a shell covering a portion of the core member along the first end of the core member. The male welding lead connector also preferably includes a hollow cylindrical sheath slidably attached along an outer surface of the male welding lead connector wherein the sheath is configured to slide from an unsheathed position proximate to the second end of the core member to a sheathed position wherein the sheath covers the plurality of rotatable discs.

In yet another aspect, a method of securing a male welding lead connector to a female welding lead connector is disclosed. The method comprises providing a male welding lead connector comprising (i) a slide button; (ii) a male welding lead connector core member including a first end and a second end, the male welding lead connector core member further comprising (1) a male welding lead connector core member slot extending lengthwise at least partially along the male welding lead connector core member; and (2) a protuberance extending radially outward proximate to the second end of the male welding lead connector core member; and (iii) a slidable member comprising a first end and a second end, the slidable member engaged in the male welding lead connector core member slot and configured to slide from a first position wherein the second end of the slidable member is farther from the second end of the male welding lead connector core member to a second position wherein the second end of the slidable member is closer to the second end of the male welding lead connector core member. The method further comprises providing a female welding lead connector comprising a female welding lead connector core member, the female welding lead connector core member further comprising (i) a cavity extending into the female welding lead connector core member, the cavity configured for receiving the second end of the core member; (ii) a first longitudinal segment of the female welding lead connector core member further comprising: (1) an entrance aperture defining an entrance to the cavity along a first end of the first longitudinal segment; and (2) a first longitudinal segment slot extending from the first end of the first longitudinal segment to a second end of the longitudinal segment; (iii) a gap directly adjacent to the first longitudinal segment along a side portion of the female welding lead connector core member wherein the first longitudinal segment slot extends to a juncture where the first longitudinal segment slot meets the gap and wherein the gap extends around the side portion of the female welding lead connector core member beyond the juncture. The method further includes inserting the second end of the male welding lead connector core member into the cavity of the female welding lead connector a distance sufficient for the protuberance to move through the first longitudinal segment slot and into the gap; rotating the female welding lead connector relative to the male welding lead connector such that the protuberance moves along the gap beyond the juncture; and moving the slide button such that the slidable member moves from the first position to the second position causing the second end of the slidable member to enter the first longitudinal segment slot, thereby blocking the female welding lead connector core member from rotating relative to the male welding lead connector core member and thereby locking the female welding lead connector to the male welding lead connector.

In some embodiments, the provided male welding lead connector further comprises the slidable member further comprising a first end and a plurality of teeth aligned in series together proximate to the first end of the slidable member; and a multiple-dial combination lock comprising a plurality of rotatable discs configured to rotate around the male welding lead connector core member and including alpha-numeric characters along outer surfaces of the discs, wherein the plurality of discs are configured to selectively align with the plurality of teeth of the slidable member based on the rotational positions of the plurality of rotatable discs wherein the slidable member is free to move from the second position to the first position when the plurality of discs are selectively aligned with the plurality of teeth and wherein the plurality of discs prevent the slidable member from moving from the second position to the first position when at least one disc of the plurality of discs is misaligned with the plurality of teeth of the slidable member.

In a preferred embodiment, moving the slide button further comprises rotating at least one of the rotatable discs to misalign the at least one of the rotatable discs with the plurality of teeth of the slidable member, thereby preventing the slidable member from moving back to the first position to unlock the female welding lead connector from the male welding lead connector.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 44A shows the male welding lead connector shown in FIGS. 36-43 shown positioned relative to a female welding lead connector core member of an international female welding lead connector (shown in more detail in FIGS. 45A-45C);

FIG. 44B shows the male welding lead connector from FIG. 44A being oriented to engage with the female welding lead connector core member;

FIG. 44C shows a first segment of the female welding lead connector core member from FIG. 44A and FIG. 44B being lined up to engage with the male welding lead connector so that a first longitudinal segment slot of the first segment lines up with the protuberance along the second end of the male welding connector core member;

FIG. 44D shows the first segment of the female welding lead connector core member placed on the second end of the male welding lead connector core member wherein the protuberance has cleared the first longitudinal segment slot;

FIG. 44E shows the first segment of the female welding lead connector core member having been rotated relative to the male welding lead connector such that the female welding lead connector core member is engaged with the male welding lead connector and wherein the first longitudinal segment slot is lined up with the second end of the slidable member of the male welding lead connector;

FIG. 44F shows the second end of the slidable member having popped out into the first longitudinal segment slot, thereby preventing the female welding lead connector core from rotating relative to the male welding lead connector, thus securing the female welding lead connector to the male welding lead connector;

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 15:
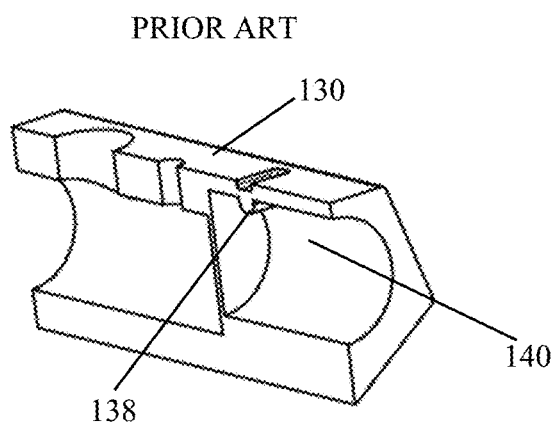
FIG. 15 shows a perspective cross-sectional view of the female welding lead connector core member shown in FIG. 13.
Figure 16:
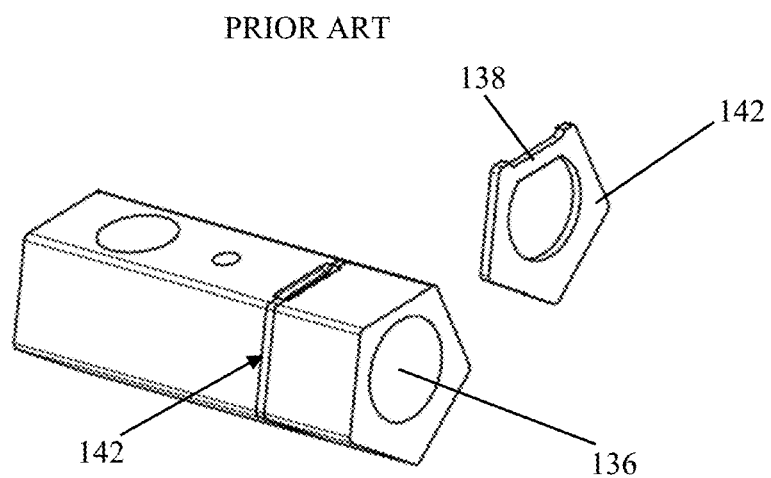
FIG. 16 shows a perspective view of the female welding lead core member core member and a slice of the female welding lead core member for illustrative purposes to show the segment of the female welding lead connector core member where a protrusion is located.

FIGS. 1-13 show different views of a specially configured male welding lead connector 100 configured to be secured to and locked with common female welding lead connector used in the United States (hereinafter, "United States female welding lead connectors") such as, for example, Tweco™ brand female welding connectors available from Tweco Products, Inc. based in Annapolis Junction, Md. shown in FIGS. 14-16. The male welding lead connector 100 includes a male welding lead connector core member 102 preferably made of metal including a first end 104A and a second end 104B. In some embodiments, the male welding lead connector core member 102 includes two main parts including a first core member piece 106A and a second core member piece 106B. A first end 107 of the first core member piece 106A is configured to fit inside a second core member piece first cavity 212 to join the first core member piece 106A and the second core member piece 106B. The male welding lead connector core member 102 further includes an annular space 108 defined in part by an annular channel 110 proximate to the second end 104B of the male welding lead connector core member 102. The male welding lead connector core member 102 further includes a slot 112 extending at least partially along the male welding lead connector core member 102 to the second end 104B of the male welding lead connector core member 102. The male welding lead connector core member 102 also includes an annular ring 114 along the second end 104B of the male welding lead connector core member 102 and directly adjacent to the annual channel 110, the ring 114 including a flat edge 116 including a notch 118 defining a second end 120B of the slot 112. The annular channel 110 terminates adjacent to the flat edge 116 but the annular space 108 as defined herein continues completely around the second end 104B of the core member 102 in the shape of a donut or ring. A side view of this can be seen in FIGS. 18C and 18D. A first end 120A of the slot 122 is preferably located proximate to the first core member piece first end 107.

The male welding lead connector also includes a slidable member 122 preferably made of metal including a first end 124A and a second end 124B. The slidable member 122 is engaged in and slides along the slot 112 from a first position (shown in FIGS. 8-10) to a second position (shown in FIGS. 5-7). When the slidable member 122 is in the first position, the annular space 108 is clear. When the slidable member 122 is in the second position, the second end 124B of the slidable member 122 blocks a portion of the annular space 108. The significance of the slidable member 122 blocking a portion of the annular space 108 is shown in FIGS. 17A-17D and 18A-18D but is best understood with an introduction to the typical configuration of common female welding lead connectors.

Figure 14:
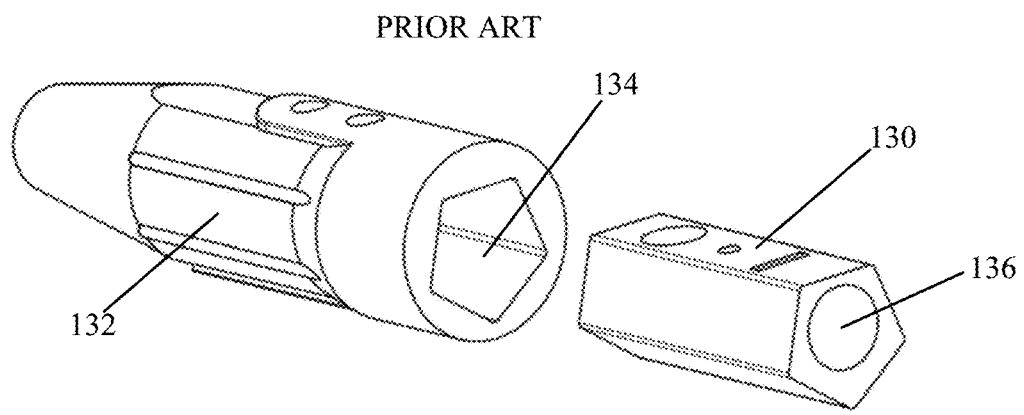
FIG. 14 shows an exploded view of a United States female welding lead connector including a female welding connector shell and a female welding connector core member.
Figure 17D:
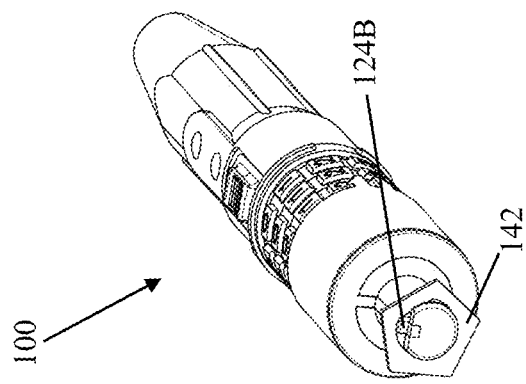
FIG. 17D shows the slidable member extending through the slice back out to the second position, thereby securing the slice (and therefore a female welding lead connector of FIG. 14) to the male welding lead connector of FIGS. 1-11, by preventing the slice from rotating backwards to disengage the female welding lead connector from the male welding lead connector.
Figure 17C:
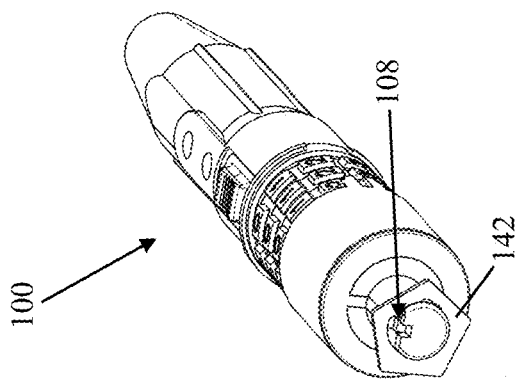
FIG. 17C shows the slice of the female welding lead connector being rotated relative to the male welding lead connector so that the protrusion of the slice is captured in an annular channel behind an annular ring of the second end of the slidable member of the male welding lead connector.
Figure 17B:
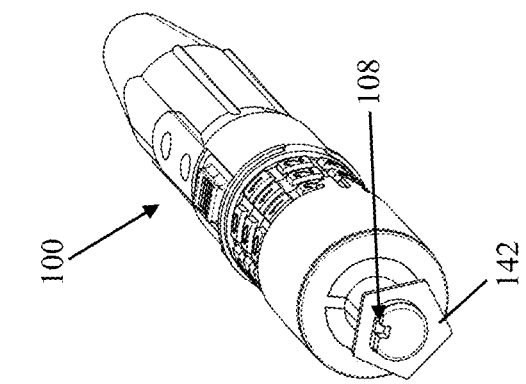
FIG. 17B shows the slice of the female welding lead connector core member from FIG. 16 being placed on the second end of the male welding connector core member of the male welding lead connector shown in FIGS. 1-11 with the protrusion from the slice pushing back the slidable member of the male welding lead connector to a first position.
Figure 17A:
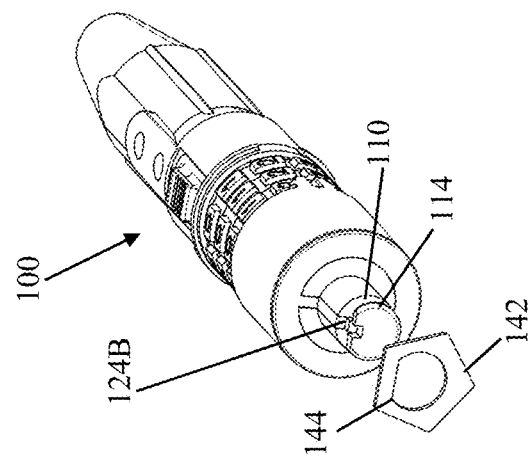
FIG. 17A shows the slice of the female welding lead connector core member from FIG. 16 being positioned to be placed on a second end of a male welding connector core member of the male welding lead connector shown in FIGS. 1-11.
Figure 18B:
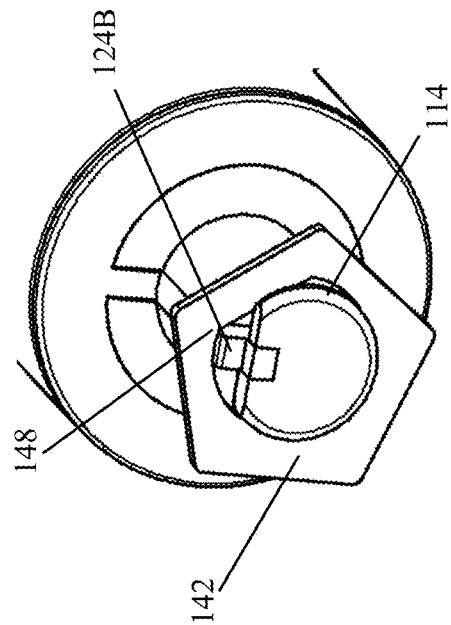
FIG. 18B shows a close up view of the second end of the male welding lead connector core member shown in FIG. 17D.
Figure 18A:
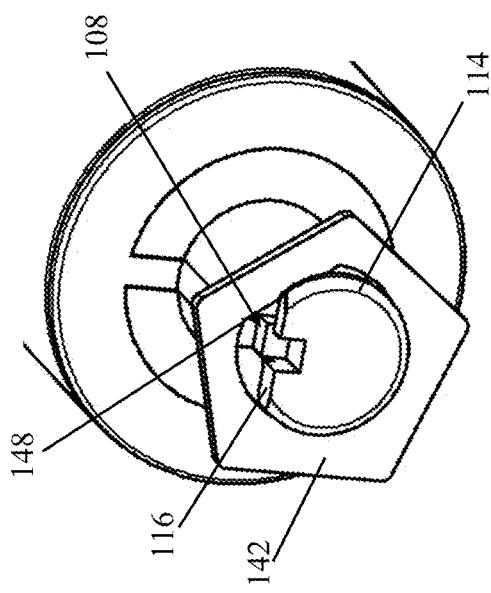
FIG. 18A shows a close up view of the second end of the male welding lead connector core member shown in FIG. 17C.
Figure 18D:
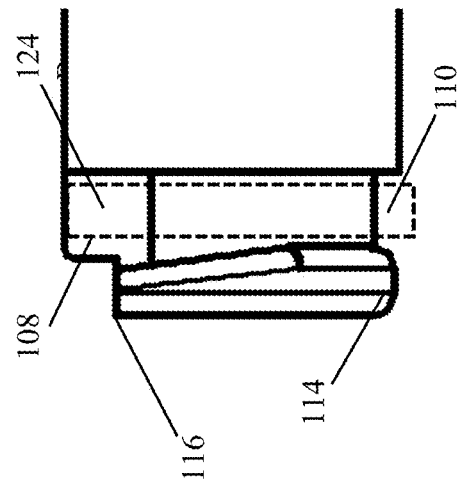
FIG. 18D shows a side view of the second end of the male welding lead connector core member including an annular space in dashed lines around the male welding lead connector core member with the slidable member in the second position blocking the annular space.
Figure 18C:
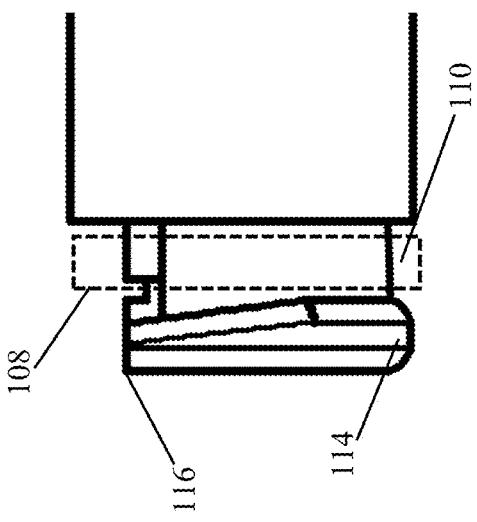
FIG. 18C shows a side view of the second end of the male welding lead connector core to member including an annular space in dashed lines around the male welding lead connector core member with the slidable member in the first position.
Figure 19:
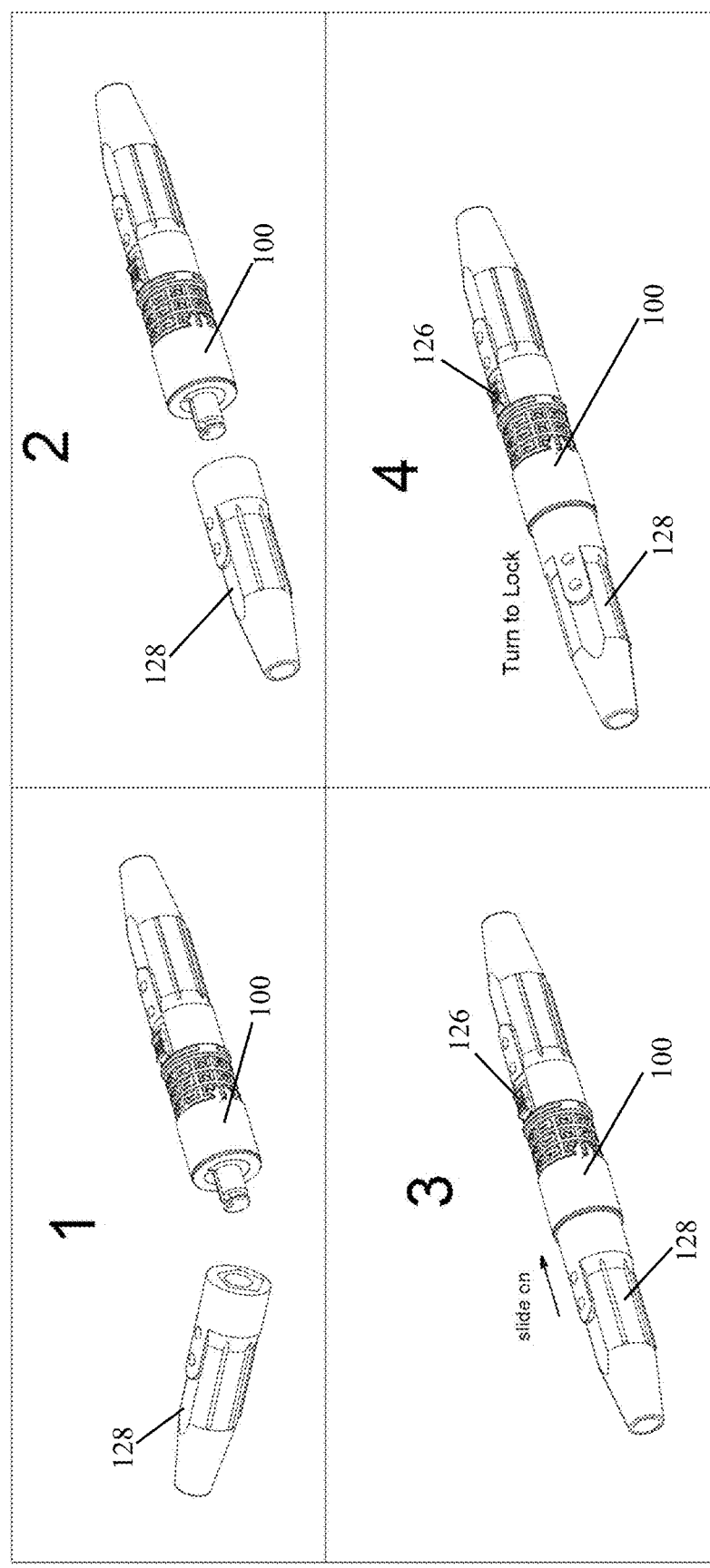
FIG. 19 shows steps for attaching the male welding lead connector from FIGS. 1-11 to a female welding lead connector like the one shown in FIG. 14.
Figure 20:
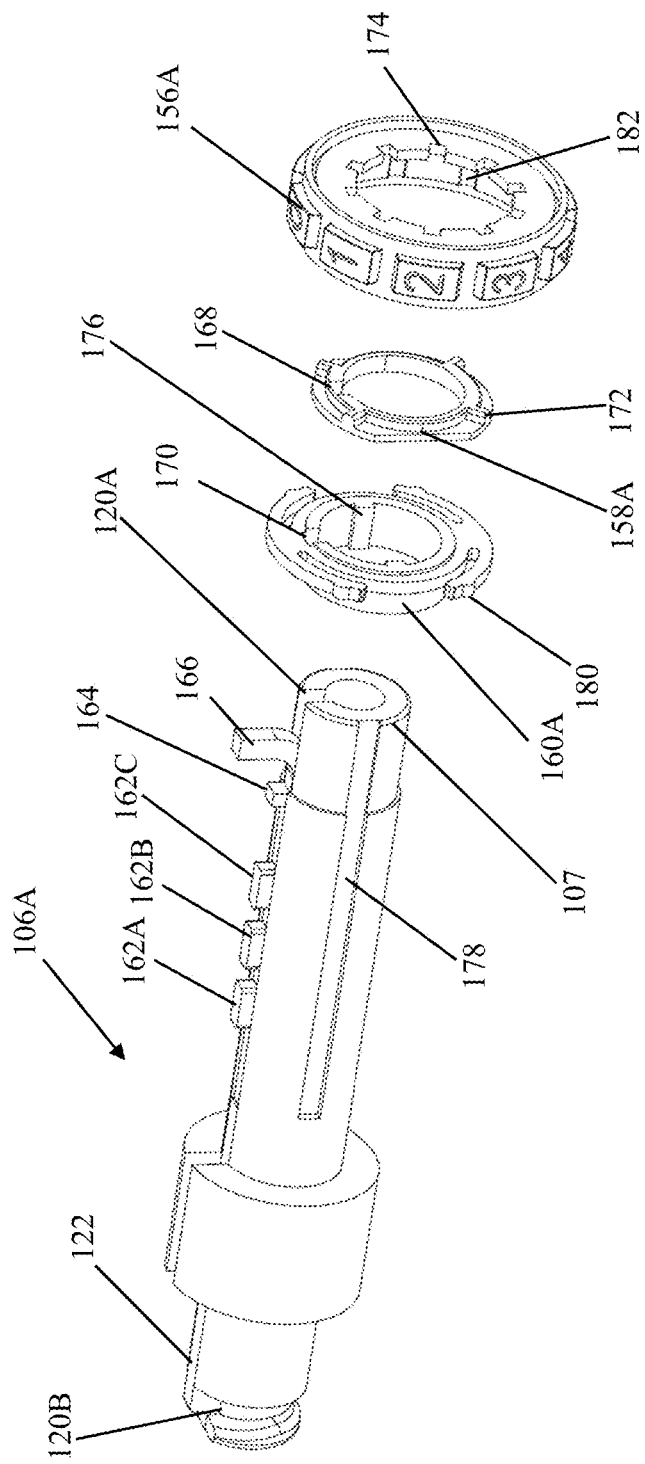
FIG. 20 shows a partially exploded view of a partially assembled male welding lead connector including a first core member piece with the slidable member in a slot along the first core member piece and a spring clip, a lock ring, and a dial disc.

FIG. 14 shows an exploded view of a prior art female welding lead connector 128 including a female welding lead connector core 130 and a shell 132. The female welding lead connector core member 130 fits in a female welding lead connector shell cavity 134. FIG. 15 shows a longitudinal cross-sectional view of the female welding lead connector core member 130 including a female welding lead connector core member cavity 136, typically cylindrical in shape and including a protrusion 138 along an interior surface 140 of the female welding lead connector core member cavity 136. For illustrative purposes, FIG. 16 shows a slice 142 of the female welding lead connector core member 130 along the portion where the protrusion 138 is located, which is the location in the female welding lead connector core member cavity 136 narrows. FIGS. 17A-17D and 18A-18D illustrate how the slice 142, and therefore the female welding lead connector 128 as a whole, interact with the male welding lead connector 100. FIG. 17A shows the second end 104B of the male welding lead connector 100 approaching the slice 142 (which represents that particular portion of the female welding lead connector 128 as a whole). FIG. 17B shows how the cross-sectional shape of the female welding lead connector core member cavity 136 along the slice 142 including the protrusion 138 fits over the second end 104B of the male welding lead connector 100. This is made possible because of the flat edge 116 of the annular ring 114 wherein the annular ring 114 is the same shape (although slightly smaller) as the cross-sectional shape of the female welding lead connector core member cavity 136 along the slice 142 where the protrusion 138 is located. In FIG. 17C (and the close-up view shown in FIG. 18A), the female welding lead connector 128 is rotated relative to the male welding lead connector 100 such that the protrusion 138 is rotated into the annular channel 110. With the protrusion 138 captured behind the annular ring 114 in the annular channel 110, the female welding lead connector 128 is engaged with the male welding lead connector 100. However, disengagement could easily occur if the female welding lead connector 128 is rotated in an opposite direction relative to the male welding lead connector 100. In order to prevent this from happening, the slidable member 122 can be moved from the first position (shown in FIG. 18A with the slice 142 and FIG. 18C without showing the slice 142 for illustrative purposes) to the second position (shown in FIG. 18B with the slice and FIG. 18D without showing the slice 142 form illustrative purposes) such that the second end 104B of the male welding lead connector core member 102 blocks a portion of the annular space 108 with the second end 104B wedged against a first end of the protrusion 138, thereby preventing the female welding lead connector 128 from rotating back relative to the male welding lead connector 100 to disengage the two devices. Thus, the specific features of the male welding lead connector 100 provide a way to secure the male welding lead connector 100 to a female welding lead connector so that the two devices will not easily rotate to disengage. FIG. 19 shows stepwise how the male welding lead connector 100 can be secured to a female welding lead connector such as the female welding lead connector 128.

The male welding lead connector 100 preferably includes a slide button 126 connected proximate to the first end 124A of the slidable member 122. The slide button 126, for example, can be moved by a user's thumb to move the slidable member 122 to the second position and secure a female welding lead connector to the male welding lead connector 100. The slidable member 122 preferably includes a projection 145 including a first end 146A and a second end 146B wherein the projection 145 is shaped to slide within an elongate cavity 147 in the first core member piece 106A. In the embodiment show in the figures, the projection 145 is cylindrical in shape and the elongate cavity 147 is also shaped in a cylindrical shape. Although a specific shape for these features is shown and described, other shapes are possible and are contemplated by this disclosure. The slidable member 122 is preferably biased to the second position by a spring 148 located between the first end 146A of the projection 145 and an internal wall 149 along the second core member piece 106B. The male welding lead connector 100 also includes a male welding lead connector shell 150 preferably made of plastic, rubber, or other non-conductive material. Although the male welding lead connector apparatus 100 as described so far is capable of being secured to a female welding lead connector, a person could still easily move the slide button 126 and move the slidable member 122 to the first position, thereby deactivating the secure connection between the male welding lead connector 100 and the female welding lead connector.

An additional advantage of the male welding lead connector 100 is its locking features which provide another layer of defense to prevent the male welding lead connector 100 from disengaging or being disengaged from a female welding lead connector. Such locking features are shown in the exploded view in FIG. 11 and include the multiple-dial combination lock 152 comprising a plurality of rotatable discs 154 configured to rotate around the male welding lead connector core member 102. In the embodiment shown in FIGS. 1-13, there are a total of three rotatable discs 154 including a first rotatable disc 154A, a second rotatable disc 154B, and a third rotatable disc 154C. The first rotatable disc 154A includes a first dial disc 156A including alphanumeric characters on its outer surface and a first lock ring 158A. The second rotatable disc 154B includes a second dial disc 156B including alphanumeric characters on its outer surface and a second lock ring 158B. The third rotatable disc 154C includes a third dial disc 156C including alphanumeric characters on its outer surface and a third lock ring 158C. There is also a plurality of spring clips 160 including a first spring clip 160A, a second spring clip 160B, and a third spring clip 160C. The spring clips do not rotate around the male welding lead connector core member 102 but the dial discs 156 and the lock rings 158 do.

Figure 21:
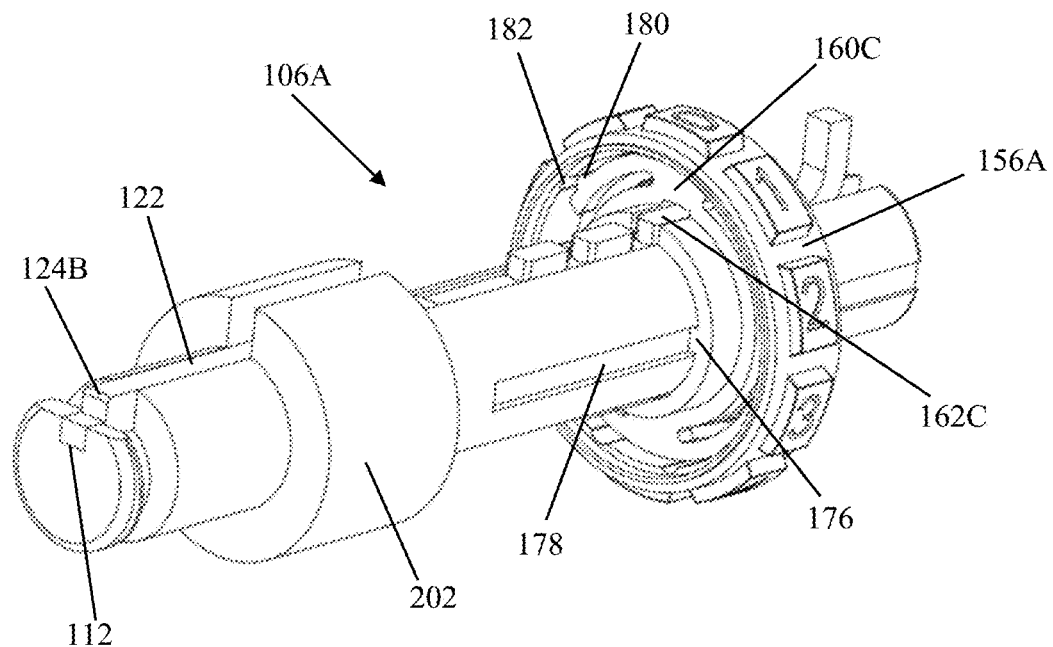
FIG. 21 shows the first core member piece from FIG. 20 with the slidable member in the slot along the first core member piece and the spring clip, the lock ring, and the dial disc placed along the first core member piece.
Figure 22:
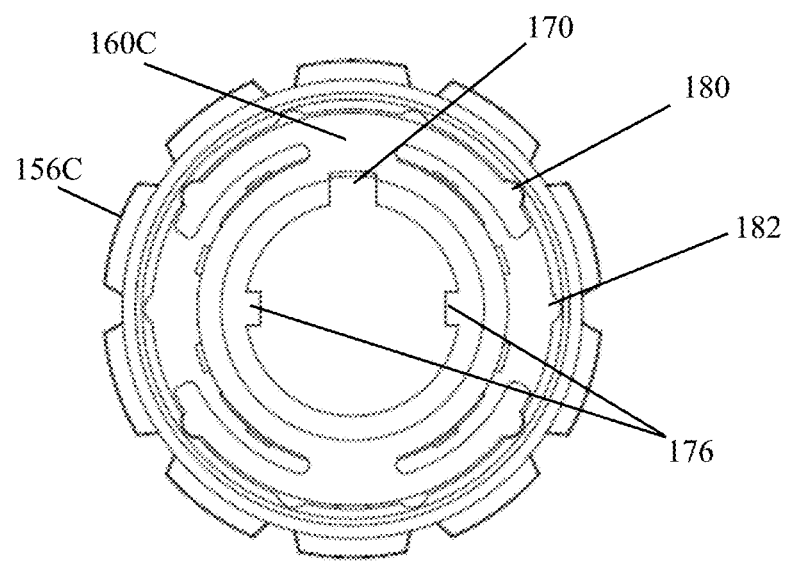
FIG. 22 shows an end view of the spring clip engaged with the dial disc from FIG. 20 and FIG. 21.
Figure 23:
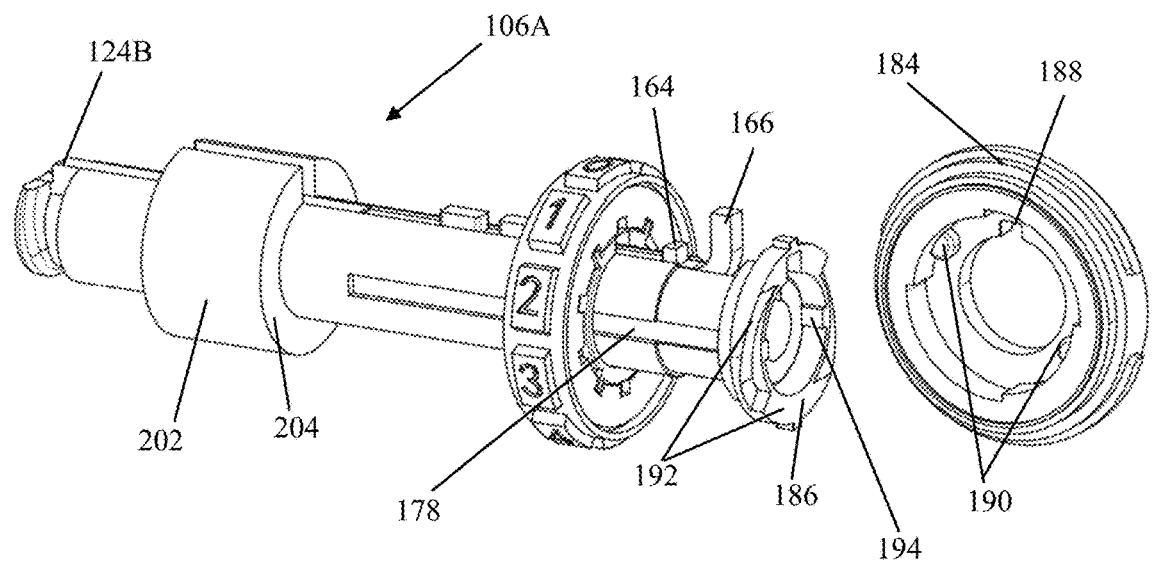
FIG. 23 shows the first core member piece from FIG. 20 and FIG. 21 further including a ram disc and a set dial.

FIG. 21 shows an exploded view including the first core member piece 106A, the slidable member 122, the first dial disc 156A, the first lock ring 158A, and the first spring clip 160A. The slidable member 122 includes a plurality of teeth 162 (including a first tooth 162A, a second tooth 162B, and a third tooth 162C) aligned in sequence, a set dial blocking nub 164, and a slide button extension 166 for connecting to the slide button 126. The lock rings 158 are configured to engage with and rotate with the dial discs 156 during normal operation but the lock rings 158 can be temporarily disengaged from the dial discs for resetting a combination on the combination lock 152 as discussed in more detail below. The lock rings 158 are preferably identical and include lock ring notches like lock ring notch 168 shown in the third lock ring 158C. The spring clips 160 are preferably identical and include spring clip notches like spring clip notch 170 shown in the third spring clip 160C. The spring clip notches are always aligned so that the plurality of teeth 162 can move freely, allowing the slidable member 122 to move from the first position to the second position and vice versa. When the lock ring notches are aligned with the plurality of teeth 162, the plurality of teeth 162 can move freely, allowing the slidable member 122 to move from the first position to the second position and vice versa. This configuration of rotatable discs 154 is referred to herein as the unlocked configuration. However, if one of the lock ring notches is misaligned with the plurality of teeth 162, the slidable member 122 is prevented from moving from the second position back to the first position, thereby placing the male welding lead connector 100 in a locked configuration when engaged with a female welding lead connector. When engaged with the dial discs 156, the positions of the lock rings 158 are dependent on the relative positions of the dial discs 156. Each lock ring 158 includes a plurality of lock ring ridges 172 configured to slide into a plurality of gaps 174 in the dial discs 156 engaging the lock rings 158 with the dial discs 156. The lock rings 158 can be disengaged from the dial discs 156 and that is discussed in more detail below. The spring clips 160 include spring clip inner ridges 176 which can slide into the first core member piece 106A along first core member side channels 178. The engagement of the spring clip inner ridges 176 and the first core member side channels 178 prevents the spring clips 160 from rotating around the first core member 106A. The spring clips 160 also include spring clip outer ridges 180 configured to engage with inner dial channels 182 inside the dial discs 156. A primary purpose of the spring clips 160 is to cause the dial discs 156 to move with individual discrete stopping points with each stopping point being correlated to a different alphanumeric character on the outer surface of the dial discs 156. The engagement between the spring clip outer rides 180 and the inner dial channels 182 is also shown in FIG. 22 and FIG. 23.

Figure 6:
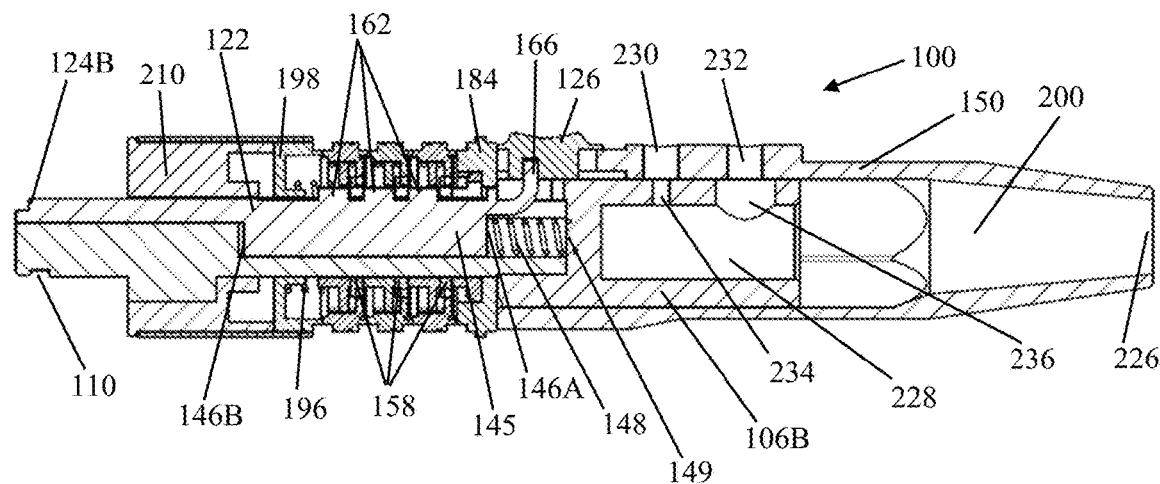
FIG. 6 shows a cross-sectional side view of the male welding lead connector shown in FIG. 5 cut at line A-A with the slidable member in the second position.
Figure 7:
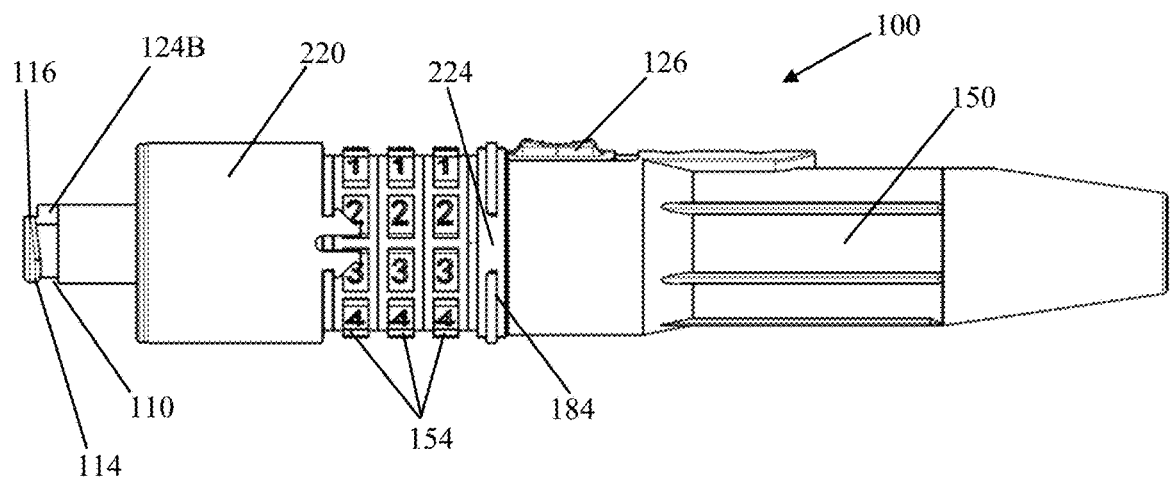
FIG. 7 shows a side view of the male welding lead connector shown in FIGS. 1-6 with the slidable member in the second position.
Figure 8:
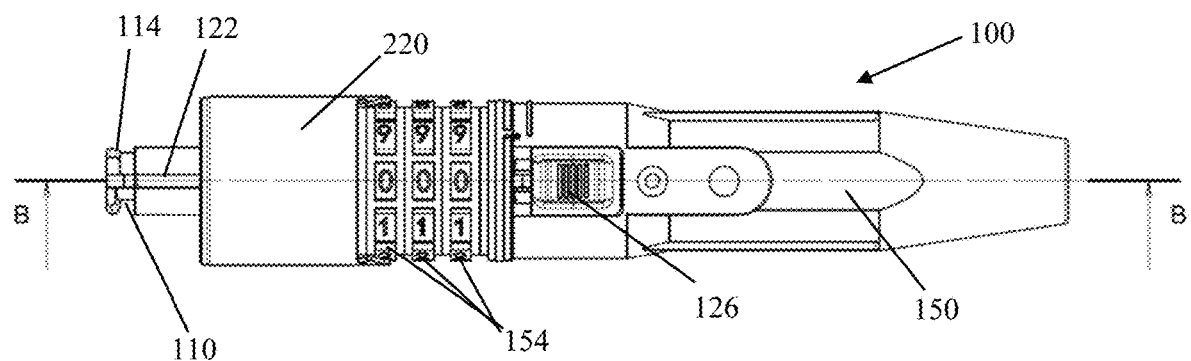
FIG. 8 shows a plan view of the male welding lead connector shown in FIGS. 1-4 including the slidable member in a first position.
Figure 24:
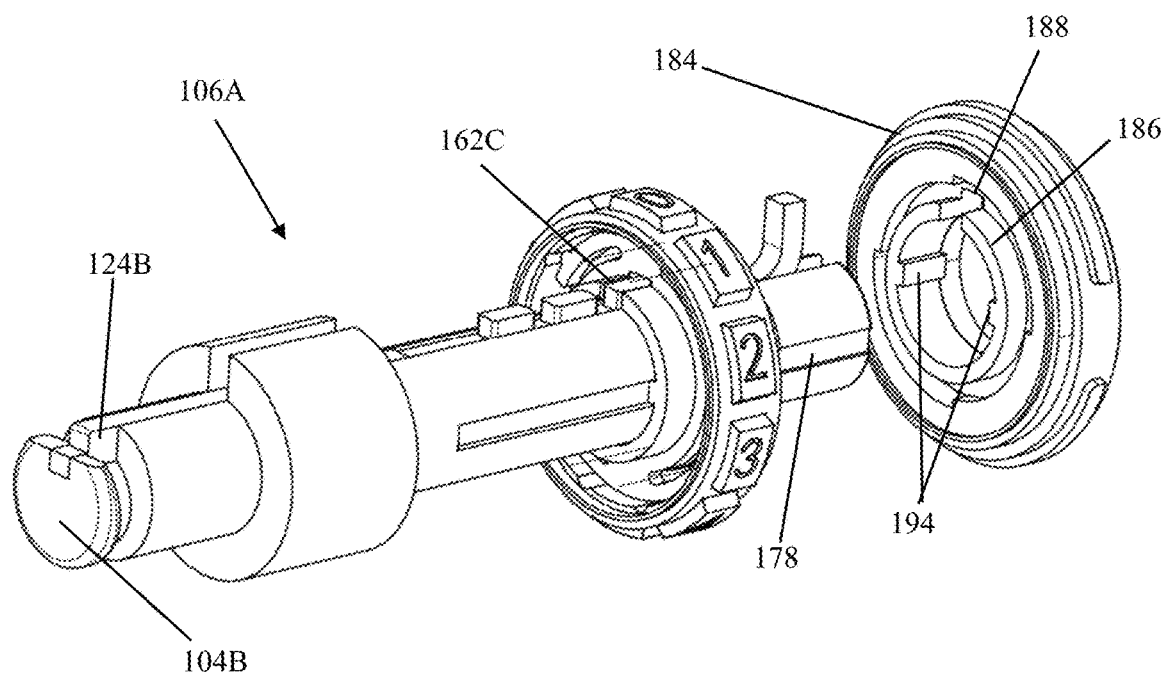
FIG. 24 shows the first core member piece from FIG. 23 showing the ram disc engaged with the set dial prior to placing the ram disc and set dial on the first core member piece.
Figure 25A:
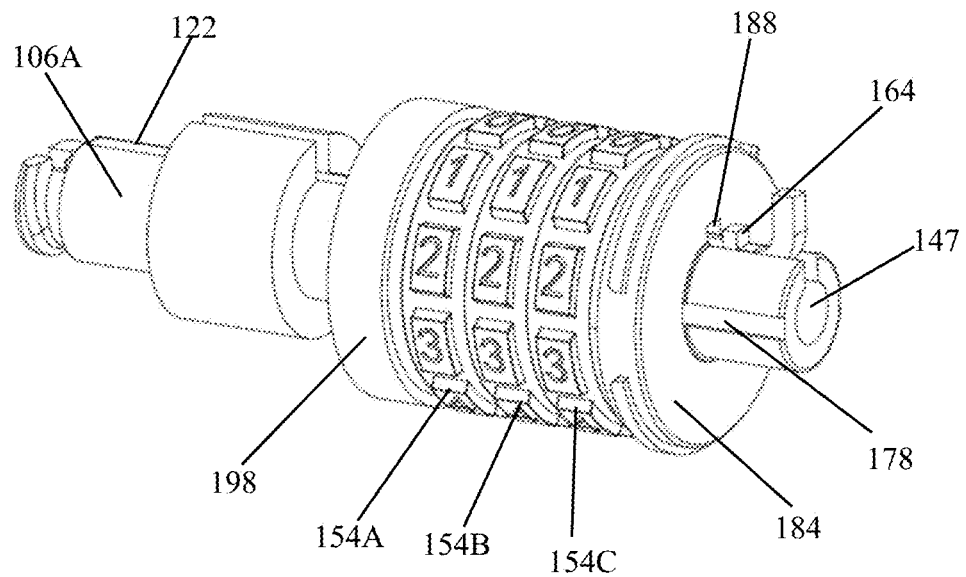
FIG. 25A shows a partially assembled male welding lead connector including multiple dial combination lock components assembled along the first core member piece with a set dial blocking nub located in a set dial slot, preventing the set dial from rotating around the first core member piece to reset the combination of the multiple dial combination lock.
Figure 25B:
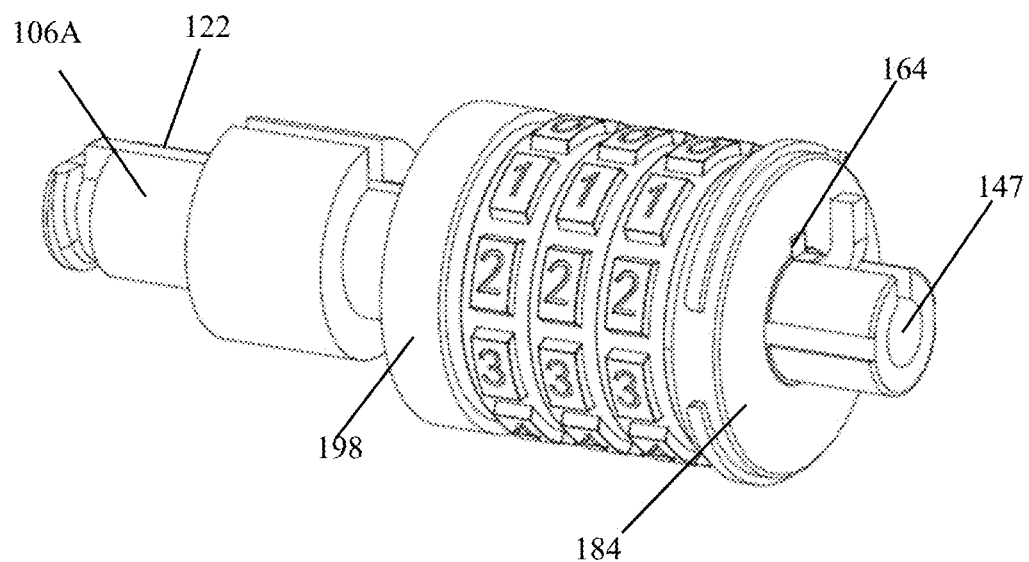
FIG. 25B shows a partially assembled male welding lead connector including multiple dial combination lock components assembled along the first core member piece with a set dial blocking nub outside of the set dial slot, allowing the set dial to rotate around the first core member piece to reset the combination of the multiple dial combination lock.

The multiple dial combination lock 152 has one configuration of rotatable discs 154 positions that causes the lock ring notches of the lock rings 158 line up so that the plurality of teeth 162 can pass into the lock ring notches for each lock ring. This is the unlocked configuration wherein the slidable member 122 can be in either the first position (FIGS. 9, 18A and 18C) or the second position (FIGS. 6, 18B and 18D). When one of the lock rings is misaligned with the plurality of teeth 162, the rotatable discs 154 are in the locked configuration and the slidable member 122 is prevented from moving back to the first position. From time to time, it is desirable to disengage the lock rings 158 from the dial discs 156 in order to change the alphanumeric character combination on the multiple dial combination lock 152 that places the rotatable discs 154 in the unlocked configuration. This is accomplished using a set dial 184 in concert with a ram disc 186, both of which fit around the first core member piece 106A. FIG. 23 shows the ram disc 186 and the set dial 184 separated and FIG. 24 show them combined together. FIGS. 25A and 25B show the set dial 184 on the first core member piece 106A as a partial assembly of the male welding lead connector 100. When the rotatable discs 154 are in the locked configuration with the slidable member 122 in the second position shown in FIG. 25B, the set dial blocking nub 164 is located in a set dial slot 188, preventing the set dial from rotating. When the rotatable discs 154 are in the unlocked configuration with the slidable member 122 in the first position shown in FIG. 25A, the set dial blocking nub 164 is outside the set dial slot 188, allowing the set dial 184 to rotate. The purpose for rotating the set dial 184 is to realign one or more lock rings 158 with one or more dial discs 156, thereby changing the combination of the multiple dial combination lock 152. This is accomplished by rotating the set dial 184 relative to the ram disc 186 so that set dial protrusions 190 slide up ram disc ramps 192, forcing the ram disc 186 toward the third lock ring 158C and disengaging the third lock ring 158C form the third dial disc 156C. This in turn causes the third lock ring 158C to press against the third spring clip 160C which presses up against the second lock ring 158B, causing the second lock ring 158B to disengage from the second dial disc 156B. This in turn causes the second lock ring 158B to press against the second spring clip 160B which presses against the first lock ring 158A, causing the first lock ring 158A to disengage from the first dial disc 156A. With all of the lock rings 158 disengaged from the dial discs 156, the dial discs 156 can independently rotate separate from the lock rings 158. The set dial 184 is able to rotate relative to the ram disc 186 because the ram disc 186 is prevented from rotating because ram disc inner protrusions 194 are engage with the first core member side channels 178.

After one or more of the dial discs 156 are rotated independently from the lock rings 158, the slidable member 122 can be moved back to the first position by moving the slide button 126. The first spring clip 160A is biased by a spring 196 pressing against an end cap 198, forcing the first lock ring 158A to reengage with the first dial disc 156A which in turn forces the second lock ring 158B to reengage with the second dial disc 156 which in turn forces the third lock ring 158C to reengage with the third dial disc 156C. With the lock rings 158 and dial discs 156 reengaged, turning one or more dial discs 156 also turns one or more correlated lock rings 158 according to a new relative spatial relationship between the one or more lock rings 158 and the one or more dial discs 156. Such new relative spatial relationship results in a new combination of alphanumeric characters being set for the multiple dial combination lock 152.

Figure 9:
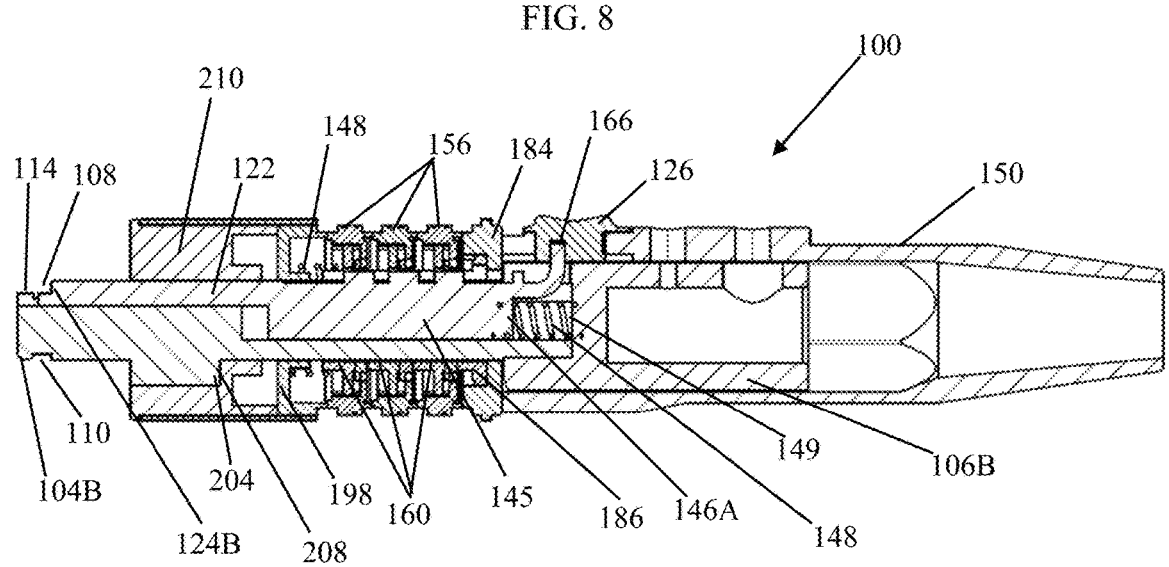
FIG. 9 shows a cross-sectional side view of the male welding lead connector shown in FIG. 5 cut at line B-B with the slidable member in the first position.
Figure 10:
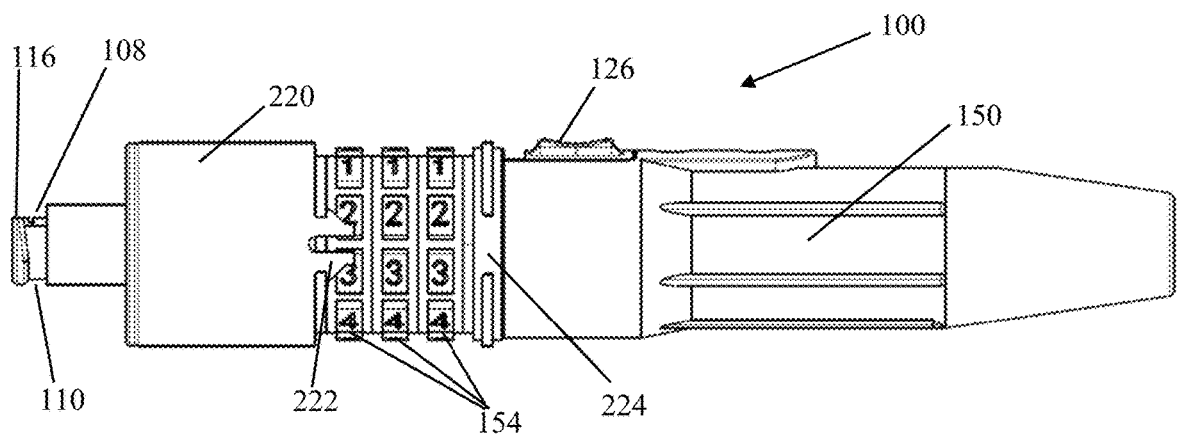
FIG. 10 shows a side view of the male welding lead connector shown in FIGS. 1-6 with the slidable member in the first position.
Figure 11:
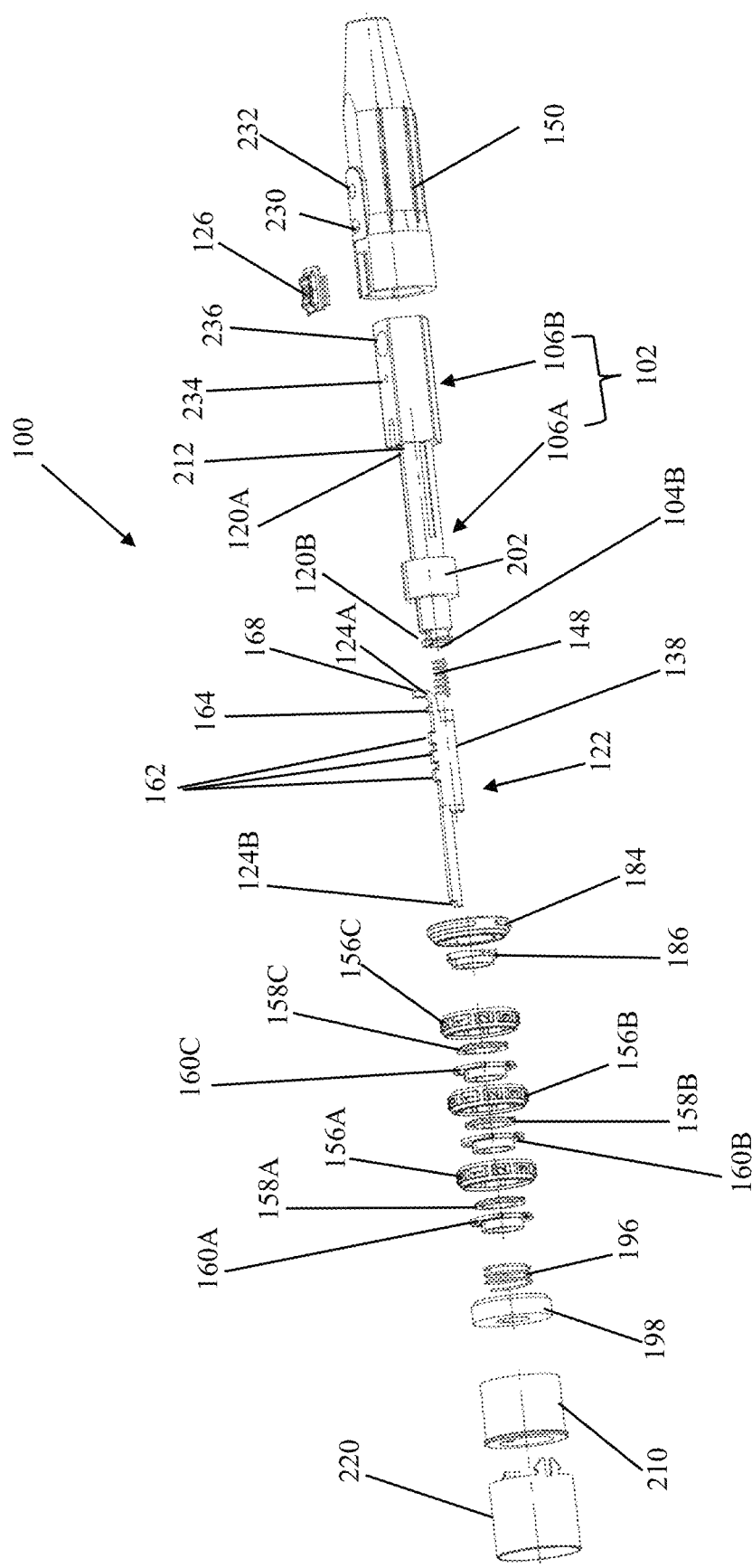
FIG. 11 shows an exploded view of the male welding lead connector shown in FIGS. 1-10.
Figure 12:
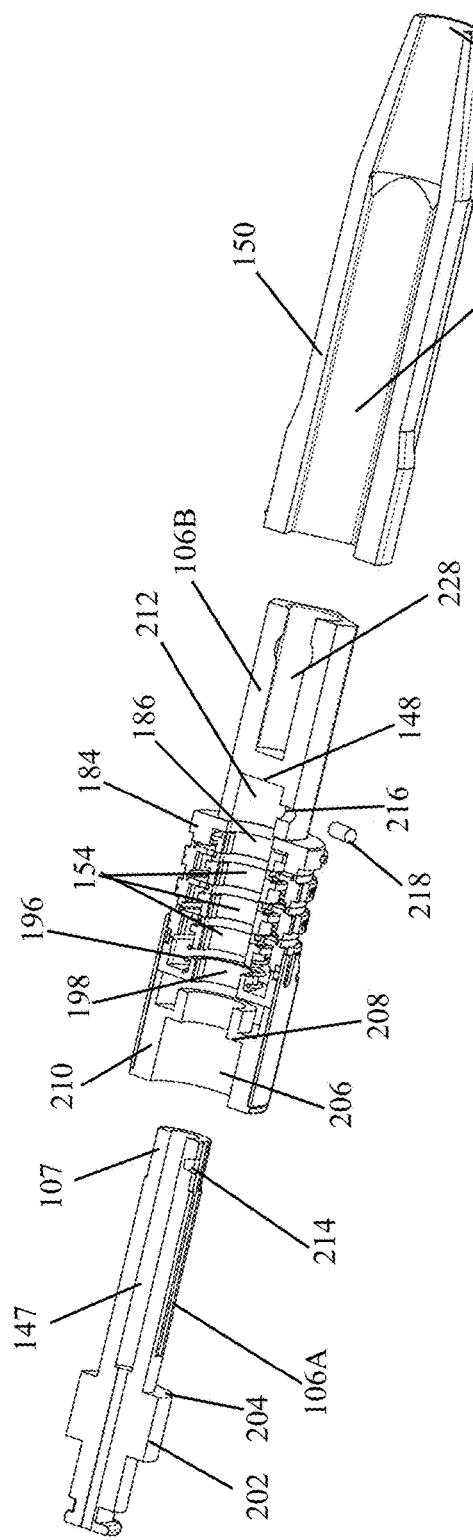
FIG. 12 shows a partially exploded view of portions of the welding lead connector shown in FIGS. 1-11.
Figure 13:
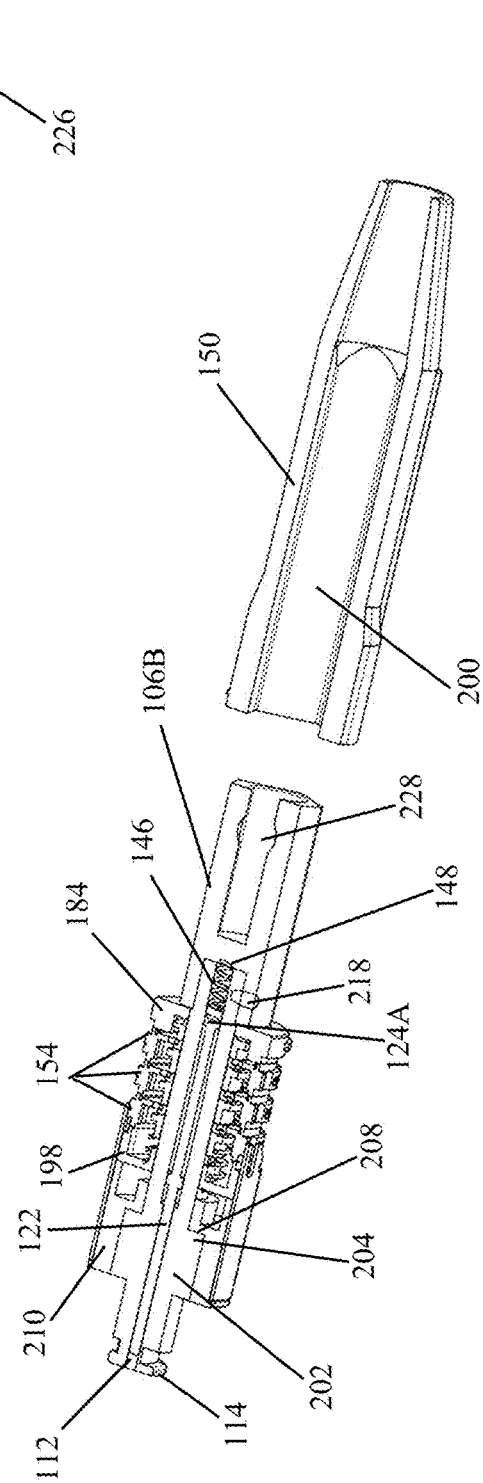
FIG. 13 shows a partially exploded view of portions of the welding lead connector shown in FIGS. 1-12.

FIG. 12 and FIG. 13 show how the parts of the male welding lead connector 100 are held together. Cross-sectional side views are also shown in FIG. 6 and FIG. 9 with the slidable member in the first position (FIG. 9) and the second position (FIG. 6). The views in these Figures are cross sectional views to better see how the parts engage with one another. FIG. 12 shows the first core member piece 106A separate from the various components that wrap around the first core member piece 106A. The shell 150 is shown separate from the second core member piece 106B. The shell 150 includes a shell cavity 200. The second core member piece 106B fits inside the shell cavity 200 when the male welding lead connector 100 is fully assembled. The first core member piece 106A includes an expanded section 202 including a shoulder 204. The expanded section 202 is configured to fit into a spacer piece cavity 206 with the shoulder 204 against a spacer piece cavity wall 208. The first core member piece 106A extends through a spacer piece 210, the end piece 198, the spring 196, the first spring clip 160A, the first lock ring 158A, the first dial disc 156A, the second spring clip 160B, the second lock ring 158B, the second dial disc 156B, the third spring clip 160C, the third lock ring 158C, the third dial disc 156C, the ram disc 186, the set dial 184 and into a second core member piece first cavity 212. The first core member piece 106A includes a first core member piece pin receptacle 214. Along the second core member piece first cavity is a second core member piece pin receptacle 216. A pin 218 is inserted into the second core member piece pin receptacle 216 and extends into the first core member piece pin receptacle 214 to hold the first core member piece 106A against the second core member piece 106B including all of the parts mentioned above situated on the first core member piece 106A between the shoulder 204 and the second core member piece 106B. The pin 218, in turn, is held in place by the shell member 150 once the second core member piece 106B is inserted into the shell cavity 200. Although a "pin" is mentioned here, it is understood that other fastening devices can be used including screws, bolts, or other fastening devices known to persons having ordinary skill in the art.

Figure 1:
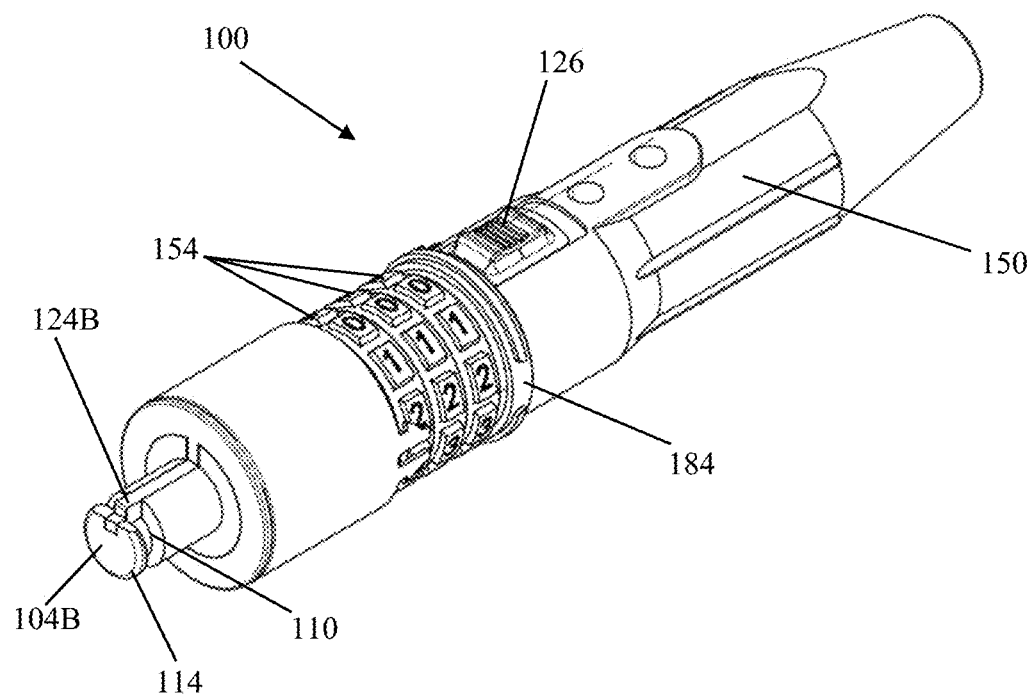
FIG. 1 shows a perspective view of a male welding lead connector including special features as described herein.
Figure 2:
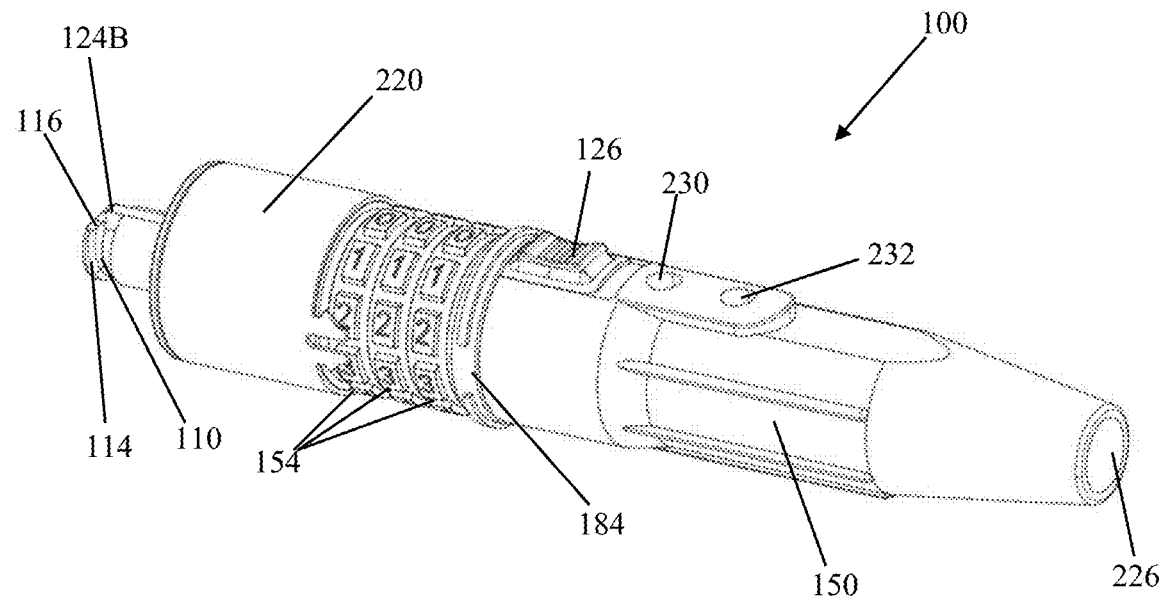
FIG. 2 shows a different perspective view of the male welding lead connector shown in FIG. 1.
Figure 3:
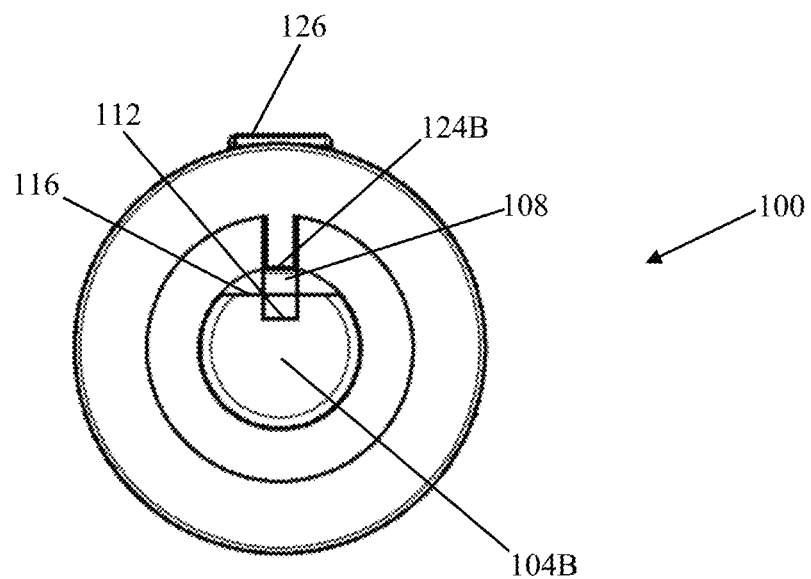
FIG. 3 shows an end view of the male welding lead connector shown in FIG. 1 and FIG. 2 looking at a second end of the male welding lead connector.
Figure 4:
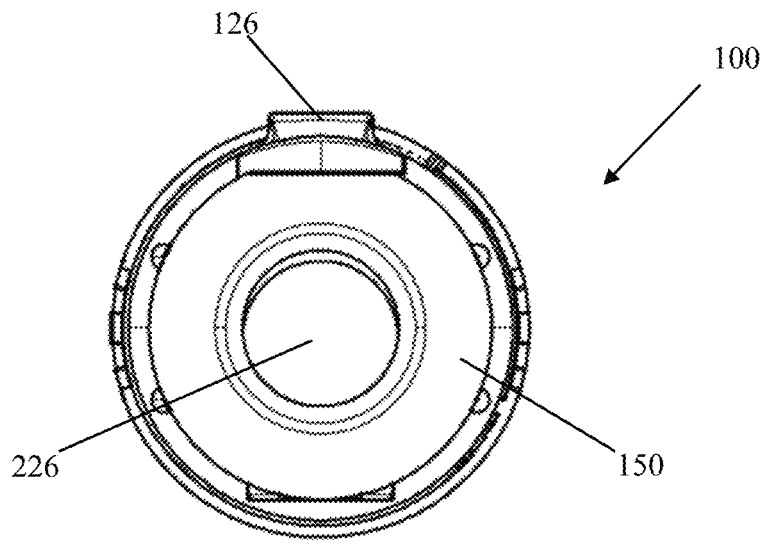
FIG. 4 shows an end view of the male welding lead connector shown in FIG. 1 and FIG. 2 looking at a first end of the male welding lead connector.
Figure 5:
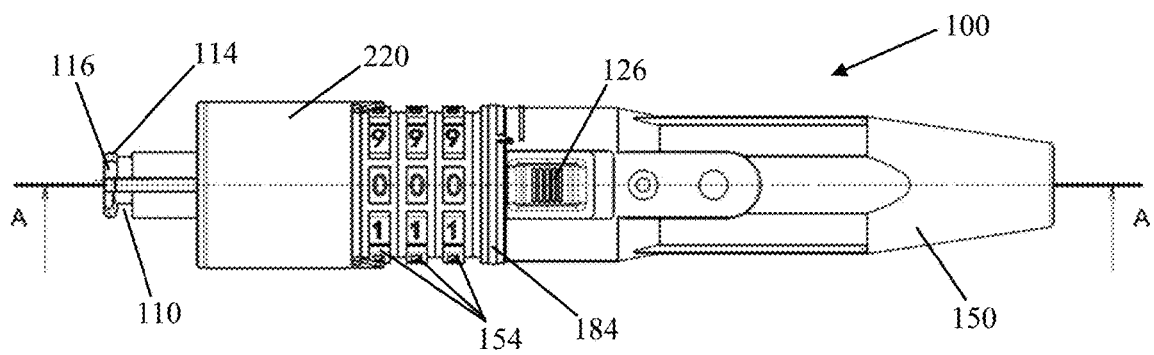
FIG. 5 shows a plan view of the male welding lead connector shown in FIGS. 1-4 including a slidable member in a second position.
Figure 26:
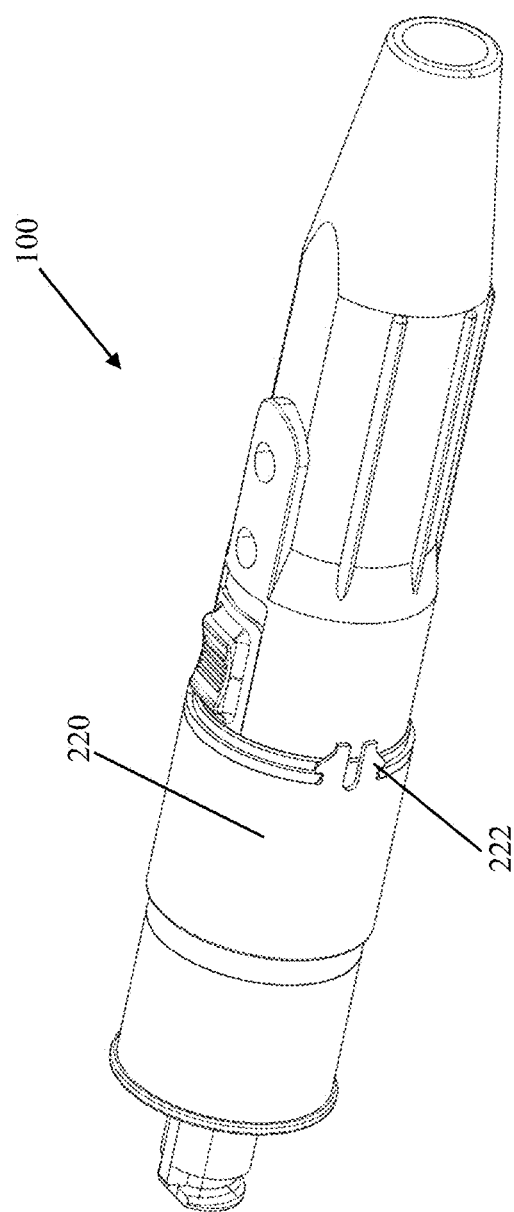
FIG. 26 shows the male welding lead connector from FIGS. 11 with a slidable dust cover slid over rotatable discs of the multiple dial combination lock to protect the multiple dial combination lock components from dirt or other debris.
Figure 27:
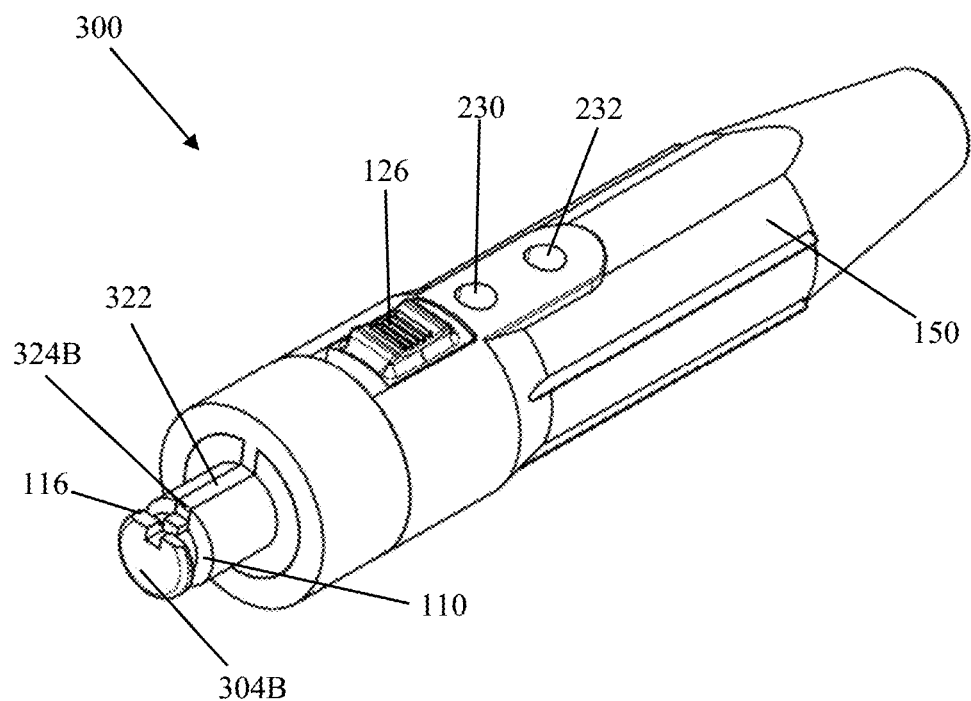
FIG. 27 shows a perspective view of a simplified version of the male welding lead connector shown in FIGS. 1-11 with a slidable member in a first position but without the multiple dial combination lock components.
Figure 28:
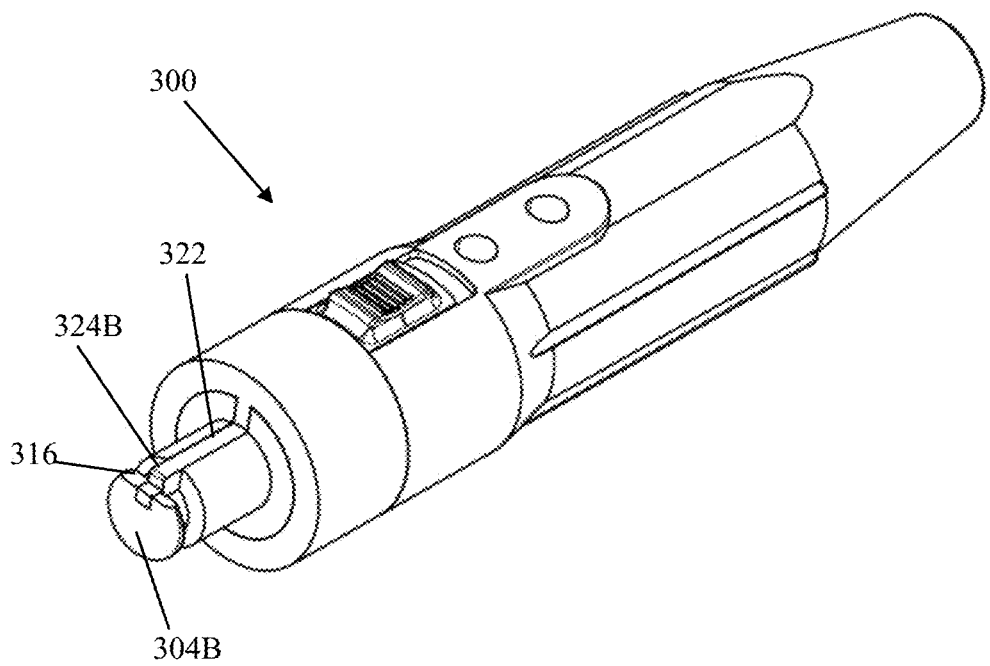
FIG. 28 shows a perspective view of the male welding lead connector from FIG. 27 with the slidable member in a second position with a second end of the slidable member blocking an annular space around the second end of the male welding lead connector core member.
Figure 29:
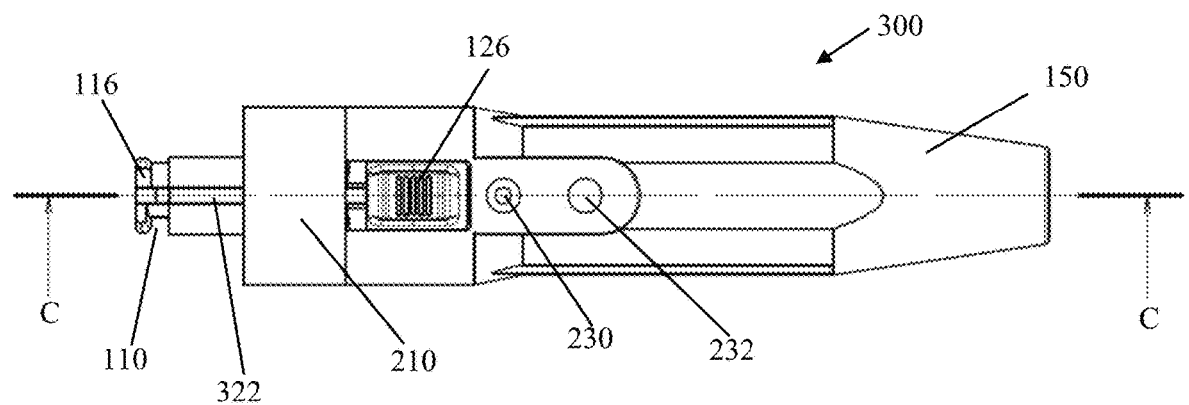
FIG. 29 shows a plan view of the male welding lead connector shown in FIG. 27 and FIG. 28 including the slidable member in the first position.
Figure 30:
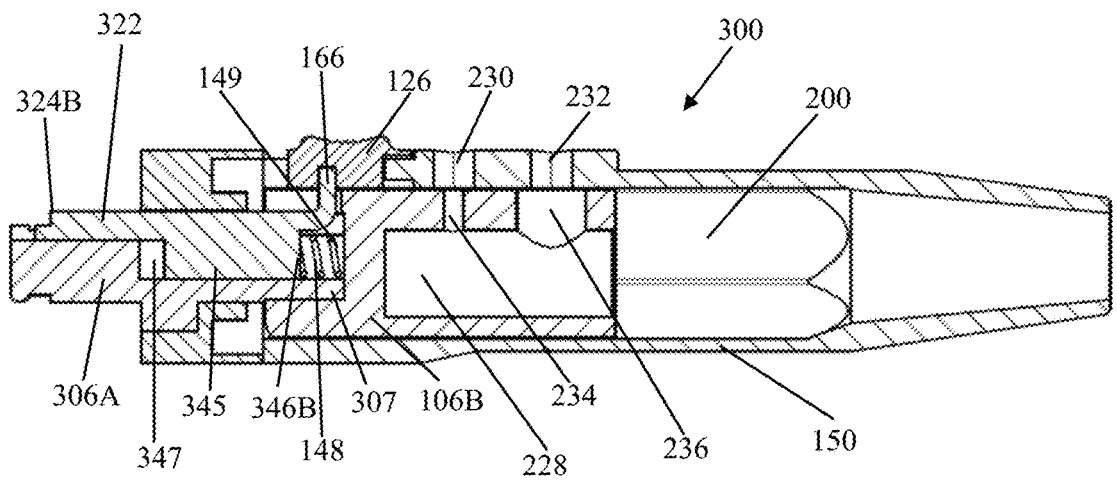
FIG. 30 shows a cross-sectional side view of the male welding lead connector shown in FIG. 29 cut at line C-C with the slidable member in the first position.
Figure 31:
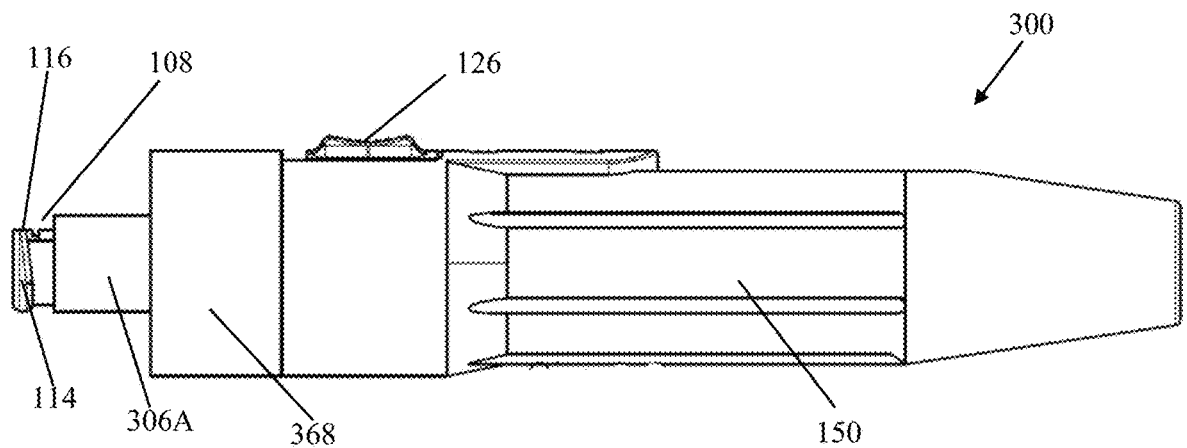
FIG. 31 shows a side view of the male welding lead connector shown in FIGS. 27-30 with the slidable member in the first position.
Figure 32:
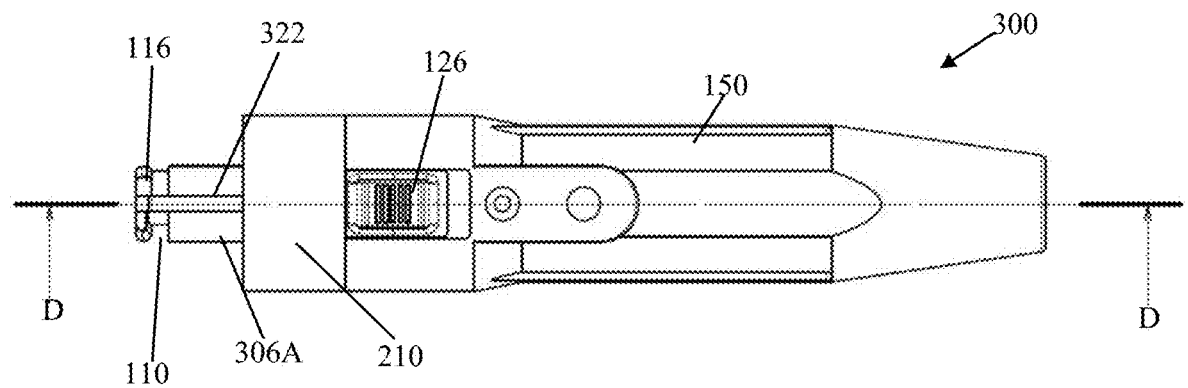
FIG. 32 shows a plan view of the male welding lead connector shown in FIGS. 27-31 including the slidable member in the second position.
Figure 33:
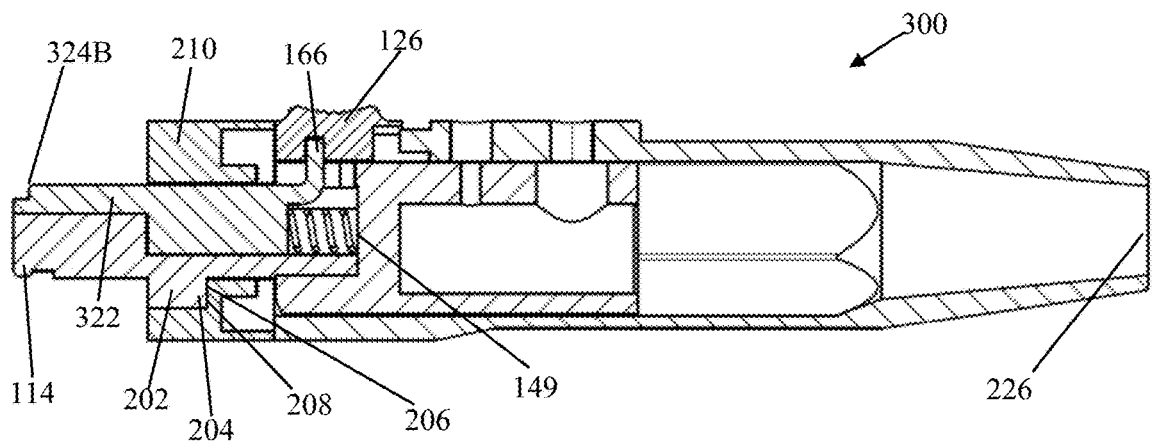
FIG. 33 shows a cross-sectional side view of the male welding lead connector shown in FIG. 32 cut at line D-D with the slidable member in the second position.
Figure 34:
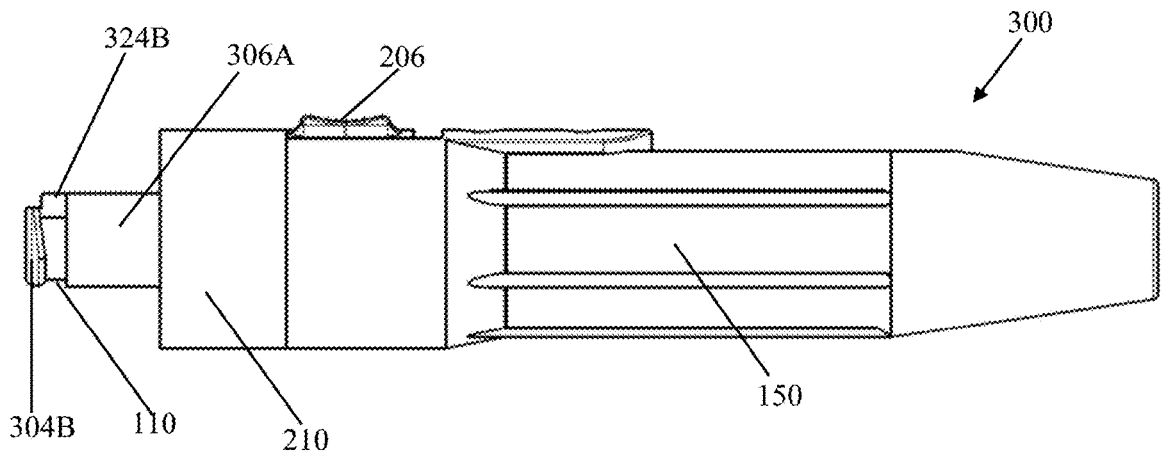
FIG. 34 shows a side view of the male welding lead connector shown in FIGS. 27-33 with the slidable member in the second position.
Figure 35:
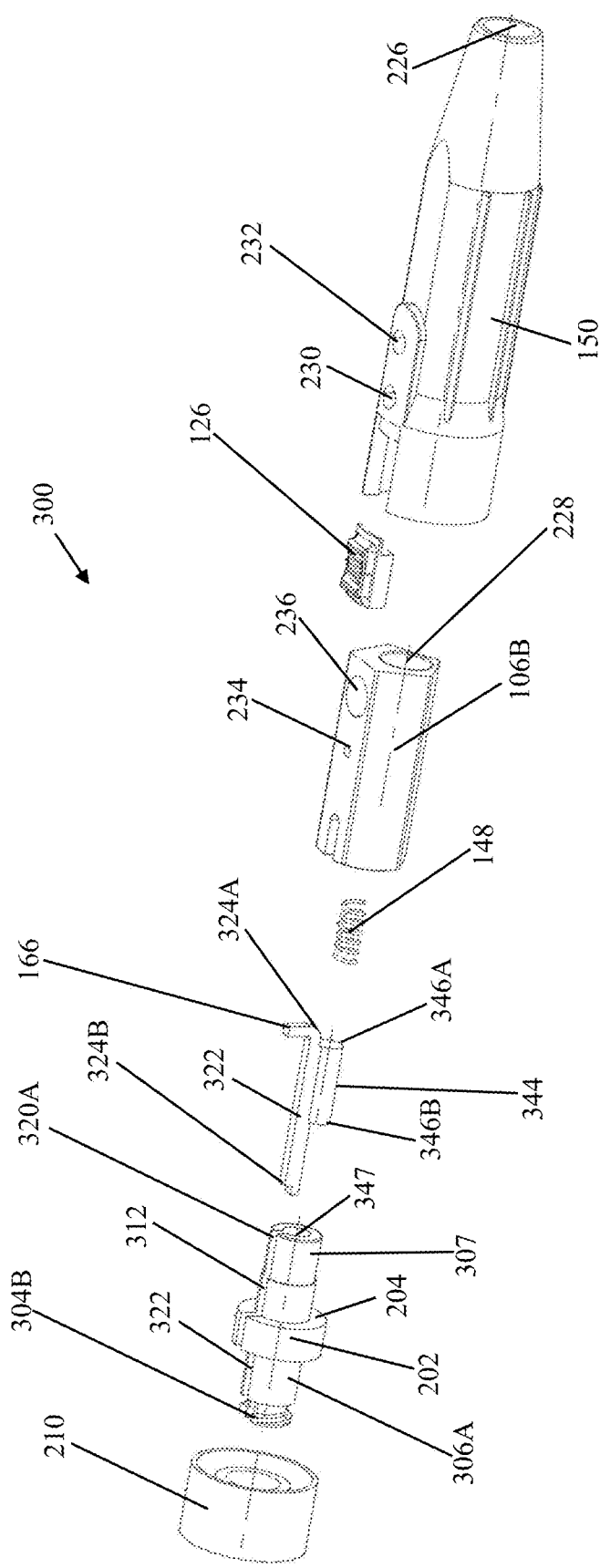
FIG. 35 shows an exploded view of the male welding lead connector shown in FIGS. 27-34.
Figure 36:
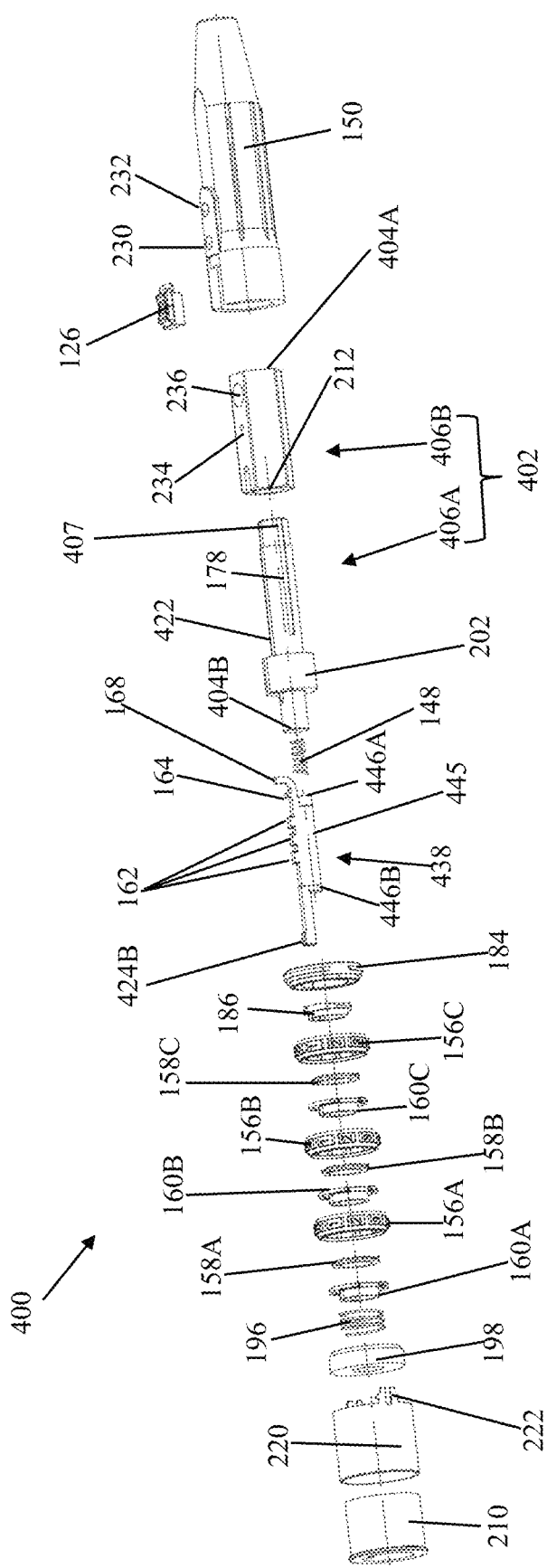
FIG. 36 shows an exploded view of a different embodiment of a male welding lead connector including a protuberance proximate to a second end of a male welding lead connector core member.

The male welding lead connector 100 preferably includes a dust cover 220 that can be slid from an open position shown in FIG. 1 and FIG. 2 in which the dust cover 220 covers the spacer piece 210 to a closed position shown in FIG. 26 wherein the dust 220 covers and protects the multiple-dial combination lock 152 from dirt or other debris when the dust cover 220 is in the closed position. The dust cover preferably includes a male latch member 222 which is configured to slide into a female latch member 224 along an outer surface of the set dial 184.

The male welding lead connector 100 is engaged to welding wire by inserting such wire through a shell end aperture 226. The wire extends into a second core member piece second cavity 228. The shell 150 includes a handle attachment aperture 230 and a set screw attachment aperture 232. The handle attachment aperture 230 is aligned with a second core member attachment aperture 234, both of which are preferably threaded. A fastening device such as, for example, a screw can be inserted through these apertures to firmly attach the shell 150 to the second core member piece 106B. The set screw handle attachment aperture 232 is aligned with a second core member set screw aperture 236, both of which are preferably threaded. A fastening device such as, for example, a screw can be inserted through these apertures to firmly attach a welding lead cable to the second core member piece 106B.

Another embodiment of a simplified male welding lead connector 300 very similar to the male welding lead connector 100 is shown in FIGS. 27-35. The male welding lead connector 300 has many of the same features as the male welding lead connector 100 discussed above, but it is simplified because it does not include a multiple dial combination lock and all of the parts related to such lock. As such, the male welding lead connector 300 is typically shorter in length than the male welding lead connector 100 described above. Notwithstanding length considerations and dial combination lock features, many of the parts of the male welding lead connector 300 are identical to those of the male welding lead connector 100 described above, so some of the same numbers are used to show such features. The male welding lead connector 300 includes a male welding lead connector core member 302 very similar to the male welding lead connector core member 102 but typically shorter in length. The male welding leading lead connector core member 302 includes a first end 304A and a second end 304B and includes a first core member piece 306A and a second core member piece 106B. A first end 307 of the first core member piece 306A is configured to fit into a second core member piece first cavity 212 to join the first core member piece 306A to the second core member piece 106B. The male welding lead connector core member 302 further includes an annular space 108 defined in part by an annular channel 110 proximate to the second end 304B of the male welding lead connector core member 302. The male welding lead connector core member 302 further includes a slot 312 extending at least partially along the male welding lead connector core member 302 to the second end 304B of the male welding lead connector core member 302. The male welding lead connector core member 302 also includes an annular ring 114 along the second end 304B of the male welding lead connector core member 302 and directly adjacent to the annual channel 110, the ring 114 including a flat edge 116 including a notch 118 defining a second end 320B of the slot 312. The annular channel 110 terminates adjacent to the flat edge 116 but the annular space 108 as defined herein continues completely around the second end 304B of the core member 302 in the shape of a donut or ring. A side view of this can be seen with reference back to FIGS. 18C and 18D showing the analogous parts from the male welding lead connector 100. A first end 320A of the slot 312 is preferably located proximate to the first core member piece first end 307.

The male welding lead connector 300 also includes a slidable member 322 preferably made of metal including a first end 324A and a second end 324B. The slidable member 322 is engaged in and slides along the slot 312 from a first position (shown in FIGS. 27 and 29-31) to a second position (shown in FIGS. 28 and 32-34). When the slidable member 322 is in the first position, the annular space 108 is clear. When the slidable member 322 is in the second position, the second end 324B of the slidable member 322 blocks a portion of the annular space 108, thereby securing a female welding lead connector 128 to the male welding lead connector 300 if the male welding lead connector 300 is engaged with a female welding lead connector 128 (see, for example, FIGS. 17A-17D and 18A-18D). The slidable member 322 is very similar to the slidable member 122 with the only difference being the lengths—the slidable member 322 is typically shorter in length than the slidable member 122 because the male welding lead connector 300 does not include multiple dial combination lock features. Similarly, the slot 322 is analogous to the slot 122 with the potential exception of the lengths of the slots. The features along the second end 304B of the core member 302 interact with a female welding lead connector 128 in the same manner as the analogous features from the male welding lead connector 100 discussed above. Such interactions are shown for example in FIGS. 17A-17D and 18A-18D and have already been discussed above.

The male welding lead connector 300 preferably includes a slide button 126 connected proximate to the first end 324A of the slidable member 322. The slide button 126, for example, can be moved by a user's thumb to move the slidable member 322 to the second position and secure a female welding lead connector to the male welding lead connector 300. The slidable member 322 preferably includes a projection 345 including a first end 346A and a second end 346B wherein the projection 345 is shaped to slide within an elongate cavity 347 in the first core member piece 306A. In the embodiment show in the figures, the projection 345 is cylindrical in shape and the elongate cavity 347 is also shaped in a cylindrical shape. Although a specific shape for these features is shown and described, other shapes are possible and are contemplated by this disclosure. The slidable member 322 is preferably biased to the second position by a spring 148 located between the first end 346A of the projection 345 and an internal wall 149 along the second core member piece 106B. The male welding lead connector 300 also includes a male welding lead connector shell 150 preferably made of plastic, rubber, or other non-conductive material. The parts of the male welding lead connector 300 are held together very similar to how the parts are held together with the male welding lead connector 100 including an expanded section 202 of the first core member piece 306A, a shoulder 204 of the expanded section 202, a spacer piece 210, a spacer piece cavity 206, and a spacer piece cavity wall 208. Preferably, a pin is used to hold the first core member piece 306A to the second core member piece 106B just like the configuration shown in FIGS. 12 and 13 regarding the male welding lead connector 100.

Figure 37:
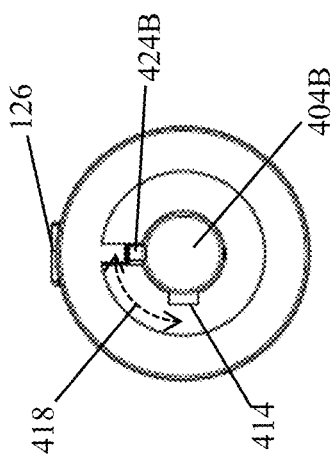
FIG. 37 shows an end view showing a second end of the male welding lead connector shown in FIG. 36 and showing a preferred relative positioning of the protuberance to a second end of a slidable member.
Figure 38:
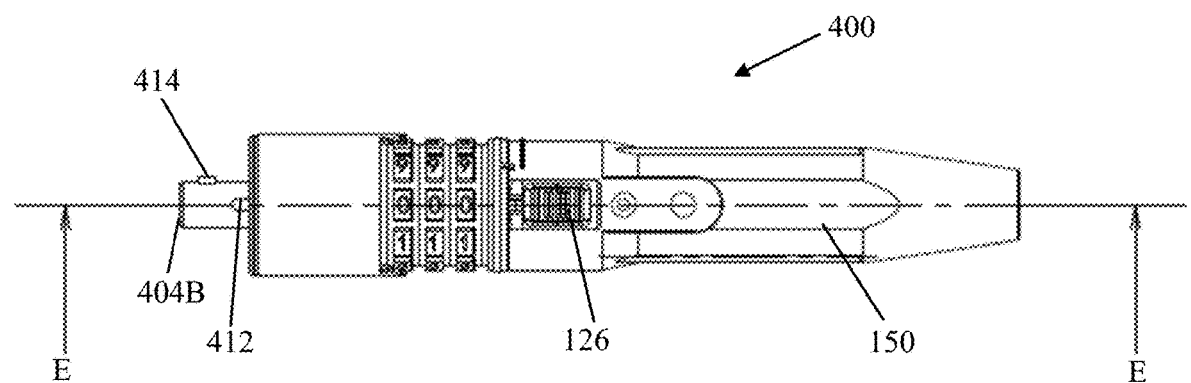
FIG. 38 shows a plan view of the male welding lead connector shown in FIG. 36 and FIG. 37 including the slidable member in a first position.
Figure 39:
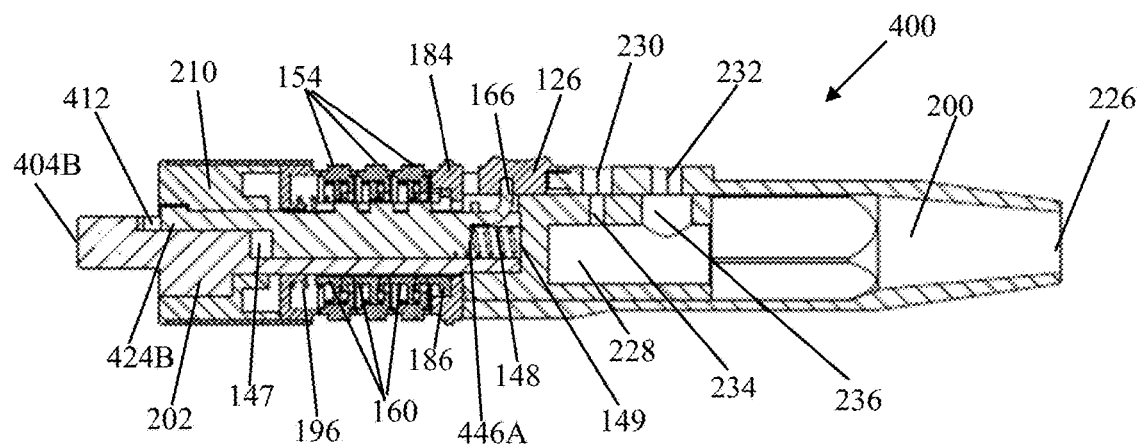
FIG. 39 shows a cross-sectional side view of the male welding lead connector shown in FIG. 38 cut at line E-E with the slidable member in the first position.
Figure 40:
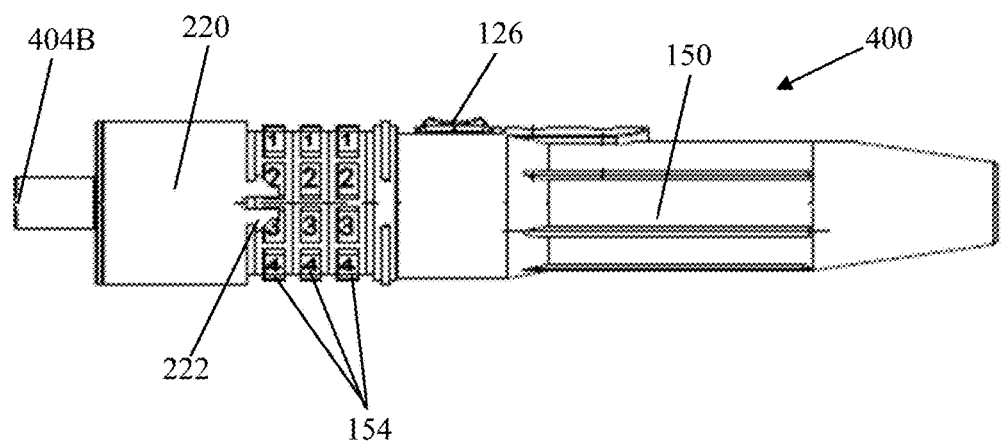
FIG. 40 shows a side view of the male welding lead connector shown in FIGS. 36-39 with the slidable member in the first position.
Figure 41:
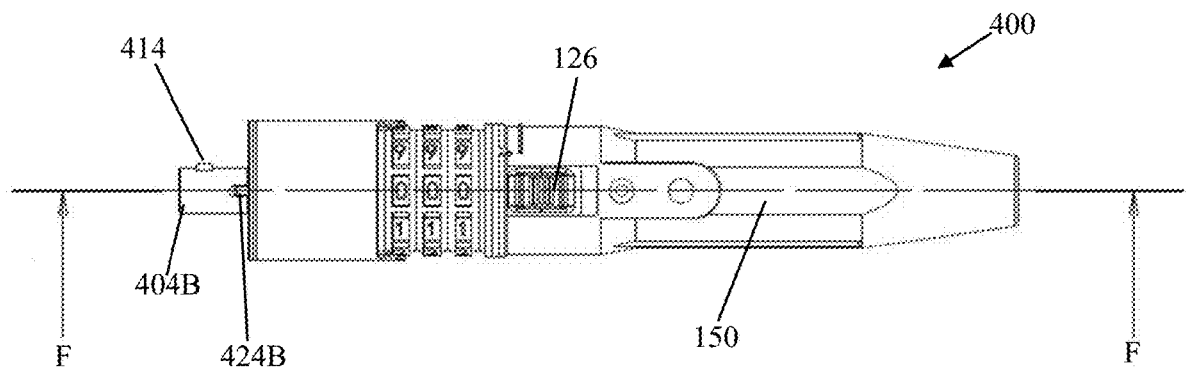
FIG. 41 shows a plan view of the male welding lead connector shown in FIGS. 36-40 including the slidable member in a second position.
Figure 42:
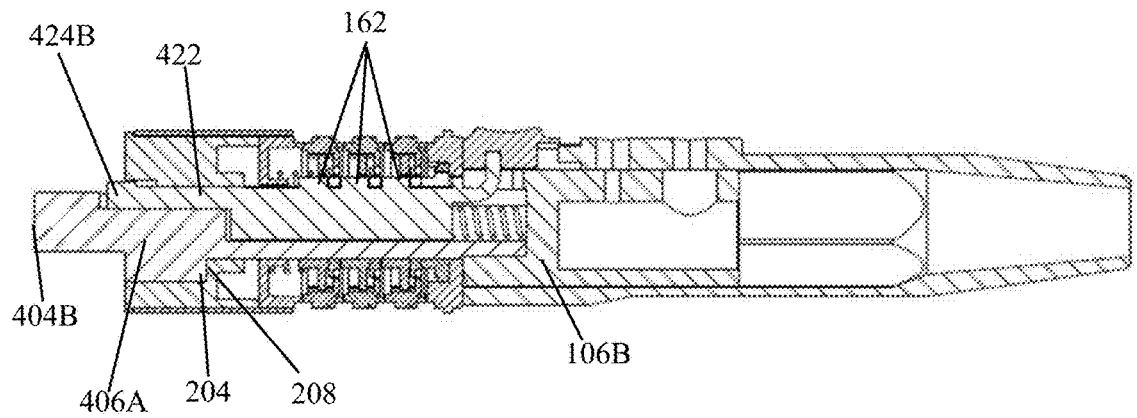
FIG. 42 shows a cross-sectional side view of the male welding lead connector shown in FIG. 41 cut at line F-F with the slidable member in the second position.
Figure 43:
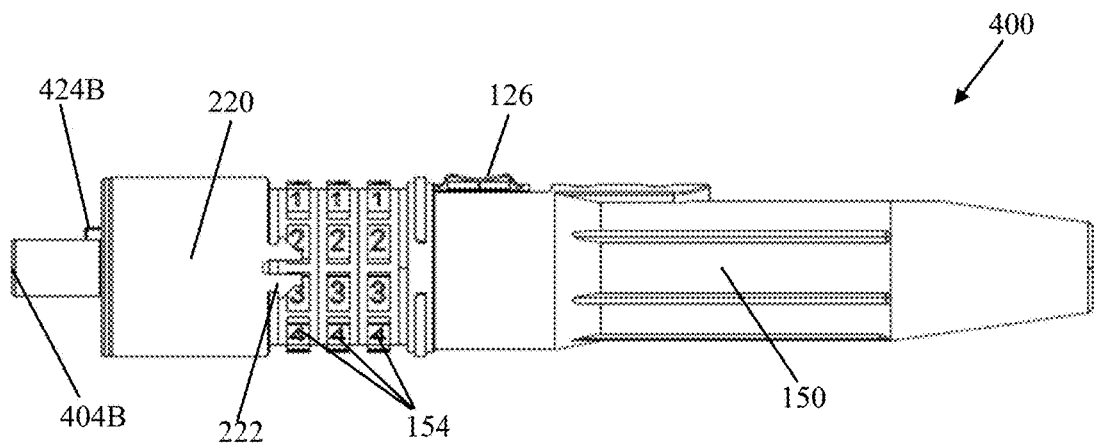
FIG. 43 shows a side view of the male welding lead connector shown in FIGS. 36-42 with the slidable member in the second position.

In addition to United States female welding lead connectors, another common type of welding lead connector is used in the U.S. and internationally (hereinafter referred to as "international female welding lead connectors") including Dinse™ brand female welding lead connectors available from Dinse Inc. based in Wood Dale, Ill. Thus, although the welding lead connector 100 and the welding lead connector 300 work well to be secured to United States female welding lead connectors, a different version of a male welding lead connector is needed to be secured to international female welding lead connectors. The male welding lead connector 400 shown in FIGS. 36-45 is configured to engage with, be secured to, and lock to an international female welding lead connector. The male welding lead connector 400 has many of the same features as the male welding lead connector 100 discussed above. Because many of the parts of the male welding lead connector 400 are identical to those of the male welding lead connector 100 described above, so some of the same numbers are used to show such features. The key differences are to the first core member piece 106A and the slidable member 122. More specifically, the male welding lead connector 400 includes a core member 402 including a first end 404A and a second end 404B wherein the second end 404B is configured to be inserted in and rotated in an international female welding lead connector (described in more detail below). The core member 402 preferably includes a first core member piece 406A and a second core member piece 106B. A first end 407 of the first core member piece 406A is configured to fit into a second core member piece first cavity 212 to join the first core member piece 406A to the second core member piece 106B. The male welding lead connector core member 402 further includes a slot 412 extending at least partially along the male welding lead connector core member 402. Unlike the slot 112 shown i the specific example described above regarding the male welding lead connector 100 and the male welding lead connector 300, the slot 412 preferably does not extend all the way to the second end 404B of the male welding lead connector core member 402. The male welding lead connector core member 402 includes a protuberance 414 extending out near the second end 404B of the male welding lead connector core member 402. Preferably, the protuberance 414 extends radially outward from the first core member piece 406A at a first radial position approximately 45 degrees relative to a second radial position defined by the location of the second end 424B of the slidable member 422. This relationship is shown in FIG. 37 including radial dashed arc line 418. The male welding lead connector 400 also includes a slidable member 422 preferably made of metal including a first end 424A and a second end 424B. The slidable member 422 is engaged in and slides along the slot 412 from a first position (shown in FIGS. 38-40) to a second position (shown in FIGS. 41-43).

The slidable member 422 includes the same features as the slidable member 122 including a projection 445, a plurality of teeth 462, a set dial protrusion 464, and a slide button extension 466. The projection 445 is shaped to slide within an elongate cavity 447 in the first core member piece 406A. In the embodiment show in the figures, the projection 445 is cylindrical in shape and the elongate cavity 447 is also shaped in a cylindrical shape. Although a specific shape for these features is shown and described, other shapes are possible and are contemplated by this disclosure. The slidable member 422 is preferably biased to the second position by a spring 148 located between the first end 446A of the projection 445 and an internal wall 149 along the second core member piece 106B.

The male welding lead connector 400 preferably includes a slide button 426 connected proximate to the first end 424A of the slidable member 422. The slide button 426, for example, can be moved by a user's thumb to move the slidable member 422 to the second position and secure a female welding lead connector to the male welding lead connector 400 as discussed in more detail below. The male welding lead connector 400 also includes a male welding lead connector shell 150 preferably made of plastic, rubber, or other non-conductive material.

Figure 45A:
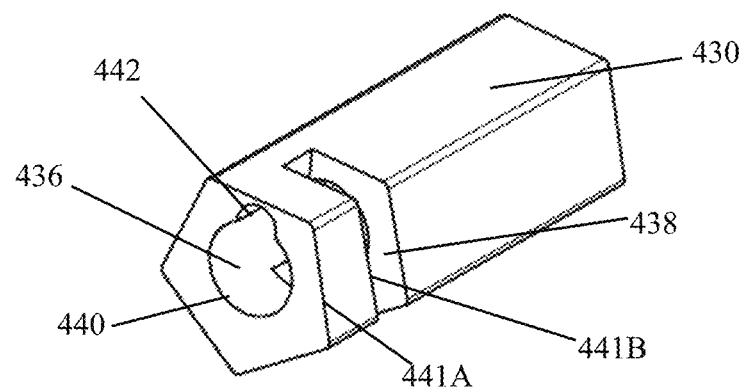
FIG. 45A shows a first perspective view of a female welding lead connector core member.
Figure 45B:
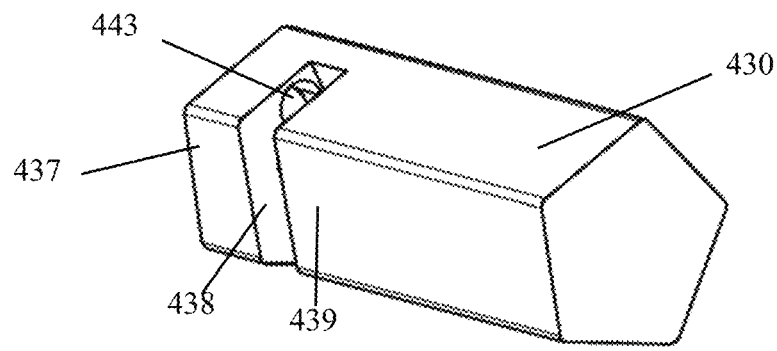
FIG. 45B shows a second perspective view of the female welding lead connector core member shown in FIG. 45A.
Figure 45C:
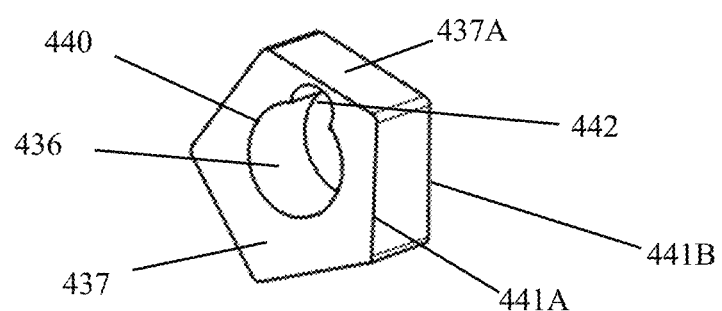
FIG. 45C shows a perspective view of a first segment of the female welding lead connector core member shown in FIG. 45A and FIG. 45B.
Figure 46:
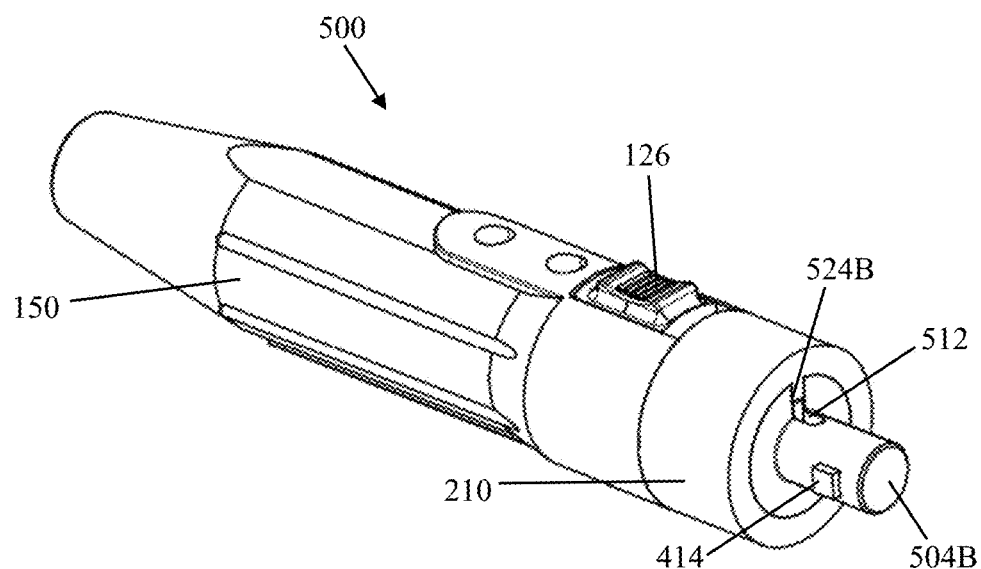
FIG. 46 shows a perspective view of a simplified version of the male welding lead connector from FIGS. 36-44F but without the multiple dial combination parts, wherein a slidable member is in a first position.
Figure 47:
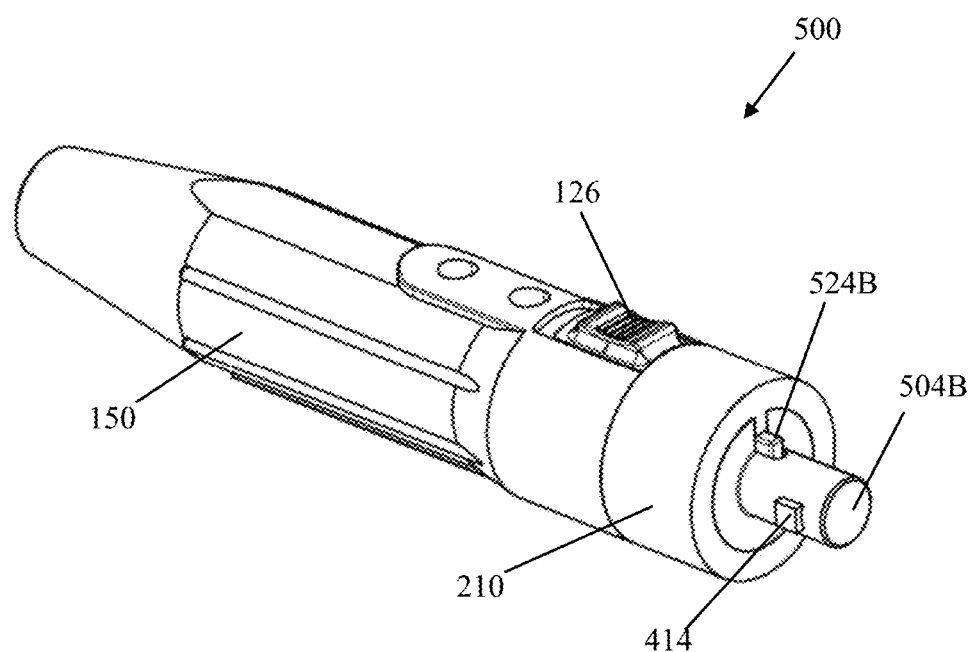
FIG. 47 shows a perspective view of the male welding lead connector from FIG. 46 with the slidable member in a second position.
Figure 48:
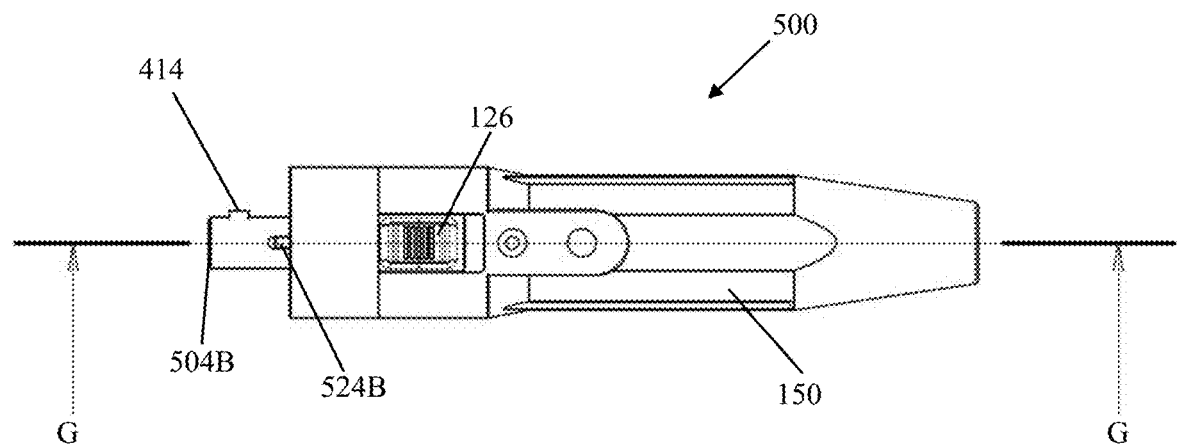
FIG. 48 shows a plan view of the male welding lead connector shown in FIG. 46 and FIG. 47 including the slidable member in the second position.
Figure 49:
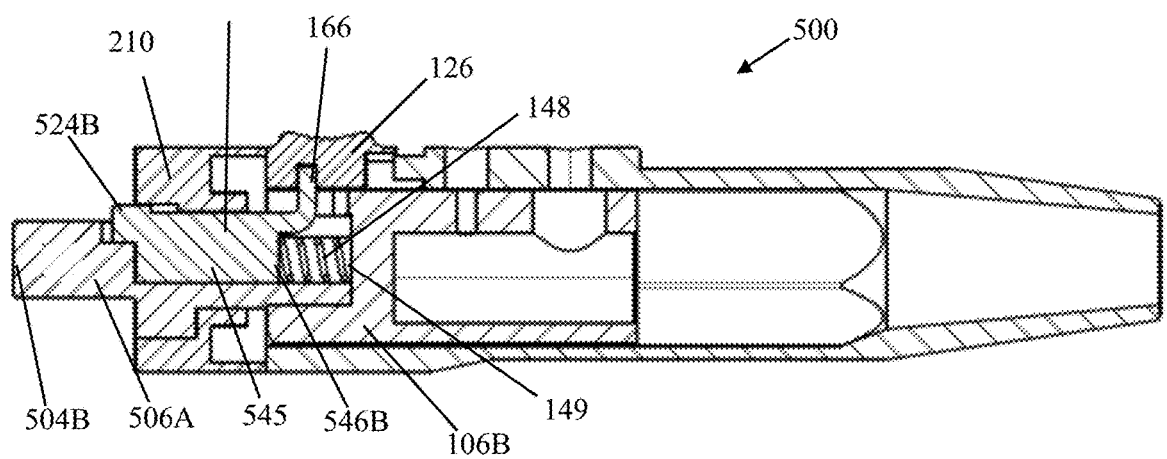
FIG. 49 shows a cross-sectional side view of the male welding lead connector shown in FIG. 48 cut at line G-G with the slidable member in the second position.
Figure 50:
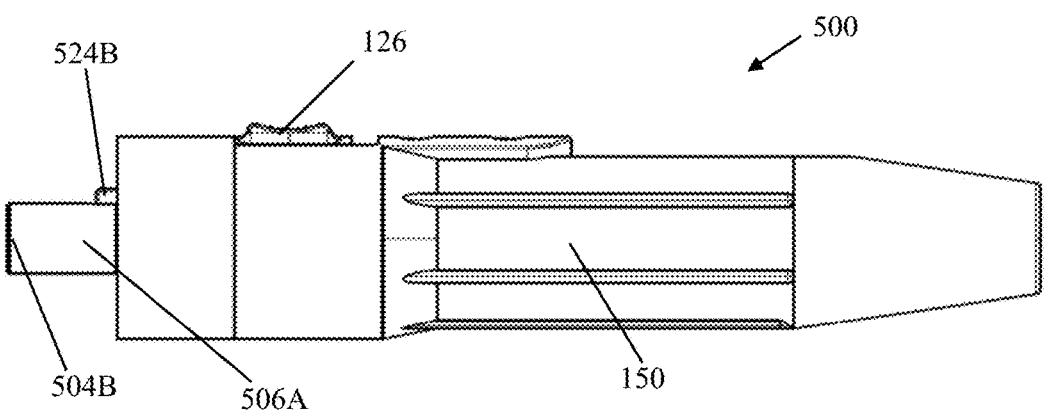
FIG. 50 shows a side view of the male welding lead connector shown in FIGS. 46-49 with the slidable member in the second position.
Figure 51:
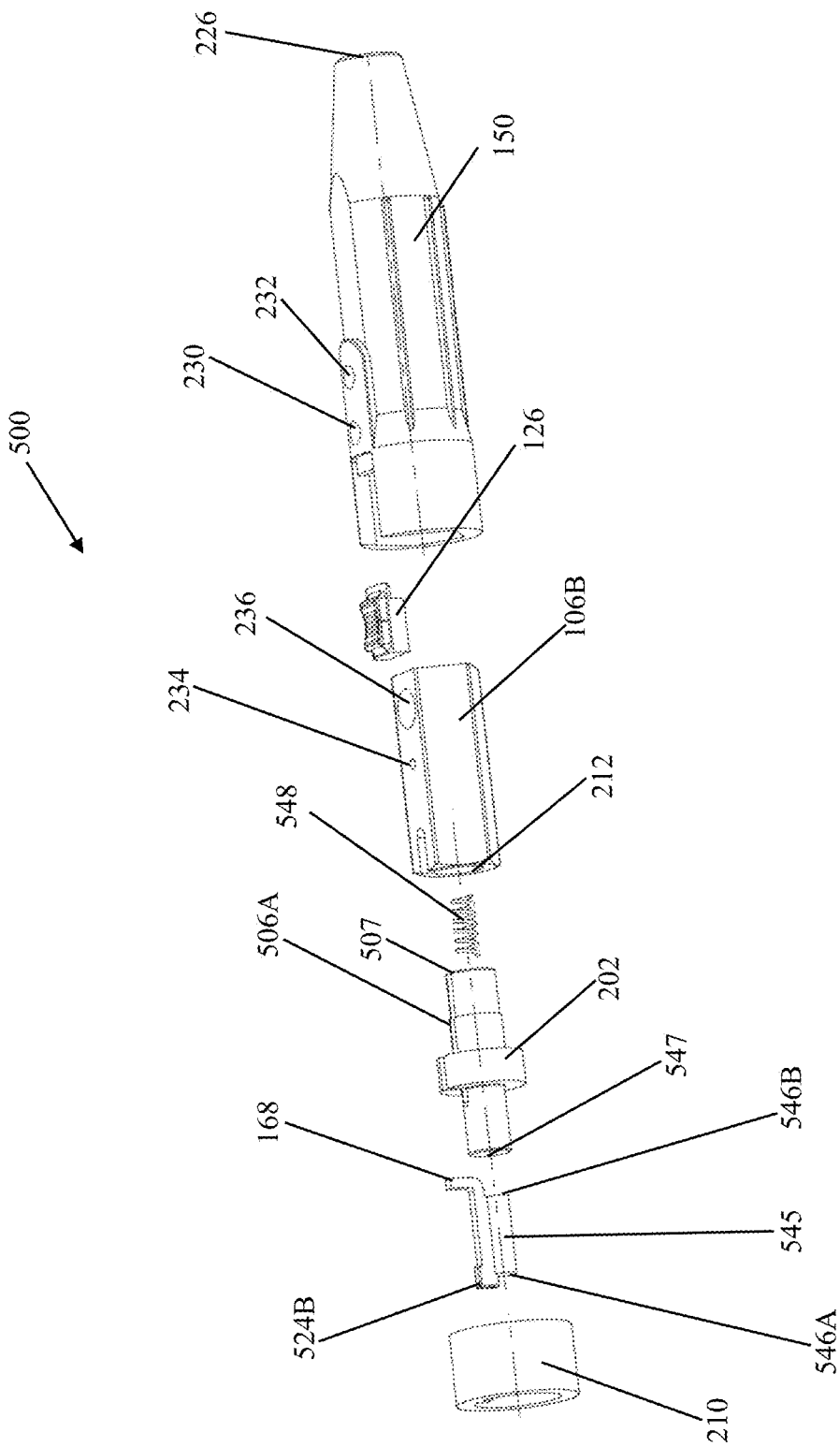
FIG. 51 shows an exploded view of the male welding lead connector shown in FIGS. 46-50.

The second end 404B of the male welding lead connector core member 402 is configured to be slid into and rotated inside a female welding lead connector core member 430 as shown in FIGS. 44A-44F and FIGS. 45A-45C. FIG. 45A and FIG. 45B show close up perspective views of the core member 430 of an international female welding lead connector. FIG. 44A shows the male welding lead connector 400 and a female welding lead connector core member 430 (which represents that particular portion of a full international female welding lead connector). The female welding lead connector core member 430 includes a female welding lead connector core member cavity 436 configured for receiving the second end 404B of the male welding lead connector core member 402, a first longitudinal segment 437, and a gap 438 directly adjacent to the first longitudinal segment 437 along a side portion 439 of the female welding lead connector core member 430. The first longitudinal segment 437 includes an entrance aperture 440 defining an entrance to the female welding lead connector core member cavity 436 along a first end 441A of the first longitudinal segment 437, and a first longitudinal segment slot 442 extending from the first end 441A of the first longitudinal segment 437 to a second end 441B of the longitudinal segment 437. FIGS. 44C-44F and FIG. 46C shows the first longitudinal segment 437 by itself to better illustrate how the male welding lead connector 400 can be secured to and locked with the female welding lead connector core member 430. FIG. 44D shows the second end 404B of the male welding lead connector 400 inserted into the first longitudinal segment 437 of the female welding lead connector core member 430. The protuberance 414 fits through the first longitudinal segment slot 442 and into the gap 438 at a juncture 443 where the first longitudinal segment slot 442 meets the gap 438. FIGS. 44D-44F show the first longitudinal segment 437 with a first side 437A removed for illustrative purposes so that the interaction of the second end 404B of the male welding lead connector 400 and the female welding lead connector core member 430 can be seen more clearly. Because the protuberance 414 has cleared the length of the first longitudinal segment slot 442 with the protuberance 414 now in the gap 438, the male welding lead connector 400 can be rotated relative to the female welding lead connector core member 430 (with the protuberance 414 moving through the gap 438) so that the first longitudinal segment slot 442 is aligned with the slidable member 422 (FIG. 44E). For prior art male welding lead connectors, the protuberance in the gap 438 against the second end 442 of the first longitudinal segment 437 keeps a male welding lead connector engaged with a female welding lead connector. However, the devices are still free to rotate relative to one another and can easily become disengaged. In contrast, with the male welding lead connector 400, because the slidable member 422 is biased to the second position because of the spring 148, when the first longitudinal segment slot 442 is aligned with the slidable member 422, the second end 424B of the slidable member 422 pops into the first longitudinal segment slot 441 (FIG. 44F), thereby securing the male welding lead connector 400 to the female welding lead connector core member 430 and preventing the female welding lead connector core member 430 from rotating relative to the male welding lead connector 400. Thus, any international female welding lead connector (which includes a female welding lead connector core member 430) can be secured to the male welding lead connector 400.

The male welding lead connector 400 includes a multiple dial combination lock 152 with all of the features and functionality of the multiple dial combination lock 152 as used in the male welding lead connector 100. More specifically, the locking function and combination resetting function using the multiple dial combination lock 152 of the male welding lead connector 400 is the same as the locking function and combination resetting function of the male welding lead connector 100. As such, those components and functions are not repeated here, and reference is made to the discussion above regarding these features and functions as used with the male welding lead connector 100. When the male welding lead connector is in a locked configuration, the slidable member 422 is in the second position and the second end 424B of the slidable member 422 is extended into the first longitudinal segment slot 441. The slidable member 422 will remain in the second position unless and until the proper combination is selected and the slide button 126 is used to move the slidable member 422 back to the first position, thereby freeing a female welding lead connector core member 430 to rotate relative to the male welding lead connector 400 so that the two devices can become disengaged.

The parts of the male welding lead connector 400 are held together very similar to how the parts are held together with the male welding lead connector 100 including an expanded section 202 of the first core member piece 406A, a shoulder 204 of the expanded section 202, a spacer piece 210, a spacer piece cavity 206, and a spacer piece cavity wall 208. Preferably, a pin is used to hold the first core member piece 406A to the second core member piece 106B just like the configuration shown in FIGS. 12 and 13 regarding the male welding lead connector 100.

Another embodiment of a simplified male welding lead connector 500 very similar to the male welding lead connector 400 is shown in FIGS. 46-51. The male welding lead connector 500 has many of the same features as the male welding lead connector 400 discussed above, but it is simplified because it does not include a multiple dial combination lock and all of the parts related to such lock. As such, the male welding lead connector 500 is typically shorter in length than the male welding lead connector 400 described above. Notwithstanding length considerations and dial combination lock features, many of the parts of the male welding lead connector 500 are identical to those of the male welding lead connector 400 described above, so some of the same numbers are used to show such features. The male welding lead connector 500 includes a male welding lead connector core member 502 very similar to the male welding lead connector core member 402 but typically shorter in length. The male welding leading lead connector core member 502 includes a first end 504A and a second end 504B and includes a first core member piece 506A and a second core member piece 106B. A first end 507 of the first core member piece 506A is configured to fit into a second core member piece first cavity 212 to join the first core member piece 506A to the second core member piece 106B. The male welding lead connector core member 502 further includes a slot 512 extending at least partially along the male welding lead connector core member 502. The male welding lead connector core member 502 includes a protuberance 414 extending out near the second end 504B of the male welding lead connector core member 502. Preferably, the protuberance 414 extends radially outward from the first core member piece 506A at a first radial position approximately 45 degrees relative to a second radial position defined by the location of the second end 524B of the slidable member 522. This relationship is the same as that shown in FIG. 37 regarding the male welding lead connector 400 including radial dashed arc line 418.

The male welding lead connector 500 also includes a slidable member 522 preferably made of metal including a first end 524A and a second end 524B. The slidable member 522 is engaged in and slides along the slot 512 from a first position (shown in FIG. 46) to a second position (shown in FIGS. 47-50). When the slidable member 522 is in the first position, the second end 524B of the slidable member 522 is recessed into the spacer piece 210 and is farther from the second end 504B of the male welding lead connector core member 502. When the slidable member 522 is in the second position, the second end 524B of the slidable member 522 extends out into the first longitudinal segment slot 441 of a female welding lead connector core member 430 if a female welding lead connector core member 430 is engaged with the male welding lead connector 500, thereby securing the female welding lead connector to the male welding lead connector 500 (see, for example, FIGS. 44A-44F and FIGS. 45A-45C). The slidable member 522 is very similar to the slidable member 422 with the only difference being the lengths—the slidable member 522 is typically shorter in length than the slidable member 422 because the male welding lead connector 500 does not include multiple dial combination lock features. Similarly, the slot 522 is analogous to the slot 422 with the potential exception of the lengths of the slots. The features along the second end 504B of the core member 502 interact with a female welding lead connector in the same manner as the analogous features from the male welding lead connector 400 discussed above. Such interactions are shown for example in FIGS. 44A-44F and have already been discussed above.

The male welding lead connector 500 preferably includes a slide button 126 connected proximate to the first end 524A of the slidable member 522. The slide button 126, for example, can be moved by a user's thumb to move the slidable member 522 to the second position and secure a female welding lead connector to the male welding lead connector 500. The slidable member 522 preferably includes a projection 545 including a first end 546A and a second end 546B wherein the projection 545 is shaped to slide within an elongate cavity 547 in the first core member piece 506A. In the embodiment show in the figures, the projection 545 is cylindrical in shape and the elongate cavity 547 is also shaped in a cylindrical shape. Although a specific shape for these features is shown and described, other shapes are possible and are contemplated by this disclosure. The slidable member 522 is preferably biased to the second position by a spring 148 located between the first end 546A of the projection 545 and an internal wall 149 along the second core member piece 106B. The male welding lead connector 500 also includes a male welding lead connector shell 150 preferably made of plastic, rubber, or other non-conductive material. The parts of the male welding lead connector 500 are held together very similar to how the parts are held together with the male welding lead connector 100 including an expanded section 202 of the first core member piece 506A, a shoulder 204 of the expanded section 202, a spacer piece 210, a spacer piece cavity 206, and a spacer piece cavity wall 208. Preferably, a pin is used to hold the first core member piece 506A to the second core member piece 106B just like the configuration shown in FIGS. 12 and 13 regarding the male welding lead connector 100.

The various male welding lead connectors described herein are useful for having a built-in feature to male welding lead connectors to secure such connectors to female welding lead connectors. Embodiments including a multiple dial combination lock offer further protection for preventing someone from unsecuring and disengaging welding lead connectors without entering the correct combination code. These features are highly advantageous because the ability to secure a male welding lead connector to a female welding lead connector limits potential electrocution hazards because the male welding lead connectors described herein prevent inadvertent or easy disengagement of welding lead connectors from one another. Because the ability to secure the male welding lead connectors described herein to female welding lead connectors is built in to the male welding lead connectors themselves, it is unnecessary to buy separate additional components or equipment to try to secure and potentially lock a prior art male welding lead connector to a female welding lead connector. Embodiments of male welding lead connectors described herein that include a multiple dial combination lock provide an extra layer of security because it prevents anyone from disengaging the male welding lead connector from a female welding lead connector without knowing and entering the correct combination code to the multiple dial combination lock.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

What is claimed is:

1. A method of securing a male welding lead connector to a female welding lead connector, the method comprising:
   a. providing a male welding lead connector comprising:
      i. a slide button;
      ii. a male welding lead connector core member including a first end and a second end, the male welding lead connector core member further comprising:
         1. a male welding lead connector core member slot extending lengthwise at least partially along the male welding lead connector core member; and
         2. a protuberance extending radially outward proximate to the second end of the male welding lead connector core member; and
      iii. a slidable member comprising a first end and a second end, the slidable member engaged in the male welding lead connector core member slot and configured to slide from a first position wherein the second end of the slidable member is farther from the second end of the male welding lead connector core member to a second position wherein the second end of the slidable member is closer to the second end of the male welding lead connector core member;
   b. providing a female welding lead connector comprising a female welding lead connector core member, the female welding lead connector core member further comprising:
      i. a cavity extending into the female welding lead connector core member, the cavity configured for receiving the second end of the core member;
      ii. a first longitudinal segment of the female welding lead connector core member further comprising:
         1. an entrance aperture defining an entrance to the cavity along a first end of the first longitudinal segment; and
         2. a first longitudinal segment slot extending from the first end of the first longitudinal segment to a second end of the longitudinal segment;
      iii. a gap directly adjacent to the first longitudinal segment along a side portion of the female welding lead connector core member wherein the first longitudinal segment slot extends to a juncture where the first longitudinal segment slot meets the gap and wherein the gap extends around the side portion of the female welding lead connector core member beyond the juncture;
   c. inserting the second end of the male welding lead connector core member into the cavity of the female welding lead connector a distance sufficient for the protuberance to move through the first longitudinal segment slot and into the gap; and
   d. rotating the female welding lead connector relative to the male welding lead connector such that the protuberance moves along the gap beyond the juncture.

* * * * *